United States Patent
Buda et al.

(10) Patent No.: US 10,571,876 B2
(45) Date of Patent: *Feb. 25, 2020

(54) INTERIOR COMFORT HVAC USER-FEEDBACK CONTROL SYSTEM AND APPARATUS

(71) Applicant: SCHNEIDER ELECTRIC USA, INC., Andover, MA (US)

(72) Inventors: Paul Robert Buda, Raleigh, NC (US); Larry A. Turner, Cary, NC (US); Scott Robert Brown, Wake Forest, NC (US); Gary Brent Pollard, Wendell, NC (US); David R. Glasgow, Wendell, NC (US); Jason Pazis, Cambridge, MA (US); Frank J. Verga, Durham, NC (US)

(73) Assignee: Schneider Electric USA, Inc., Andover, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 15/857,155

(22) Filed: Dec. 28, 2017

(65) Prior Publication Data

US 2018/0136621 A1    May 17, 2018

Related U.S. Application Data

(63) Continuation of application No. 14/956,082, filed on Dec. 1, 2015, now Pat. No. 10,254,726.

(60) Provisional application No. 62/110,393, filed on Jan. 30, 2015, provisional application No. 62/110,344, filed on Jan. 30, 2015, provisional application No. 62/110,386, filed on Jan. 30, 2015, provisional application No. 62/110,398, filed on Jan. 30, 2015, provisional application No. 62/110,379, filed on Jan. 30, 2015.

(51) Int. Cl.
| | |
|---|---|
| *G05B 15/02* | (2006.01) |
| *G05D 23/19* | (2006.01) |
| *F24F 120/20* | (2018.01) |
| *F24F 11/46* | (2018.01) |

(52) U.S. Cl.
CPC ......... *G05B 15/02* (2013.01); *G05D 23/1904* (2013.01); *G05D 23/1917* (2013.01); *F24F 11/46* (2018.01); *F24F 2120/20* (2018.01); *G05B 2219/2642* (2013.01); *Y02P 80/10* (2015.11)

(58) Field of Classification Search
None
See application file for complete search history.

(56) References Cited

U.S. PATENT DOCUMENTS

| | | | |
|---|---|---|---|
| 5,115,967 | A | 5/1992 | Wedekind |
| 6,478,233 | B1 | 11/2002 | Shah |
| 7,130,719 | B2 | 10/2006 | Ehlers |
| 2003/0217143 | A1 | 11/2003 | Dudley |
| 2007/0191987 | A1 | 8/2007 | Dang et al. |

(Continued)

*Primary Examiner* — Carlos R Ortiz Rodriguez
(74) *Attorney, Agent, or Firm* — Locke Lord LLP

(57) ABSTRACT

The INTERIOR COMFORT HVAC USER-FEEDBACK CONTROL SYSTEM AND APPARATUS transforms qualitative feedback received from a user/occupant into a "comfort map," or modifications thereto, a comfort map being defined at least in part by one or more comfort event windows. The comfort map data is used to determine a temperature setpoint sequence that avoids regions of the map corresponding to known and/or predicted regions of user discomfort.

37 Claims, 21 Drawing Sheets

(56) References Cited

U.S. PATENT DOCUMENTS

| | | |
|---|---|---|
| 2009/0065596 A1 | 3/2009 | Seem et al. |
| 2010/0262298 A1 | 10/2010 | Johnson et al. |
| 2011/0083094 A1 | 4/2011 | Laycock et al. |
| 2011/0160913 A1 | 6/2011 | Parker et al. |
| 2012/0259469 A1 | 10/2012 | Ward et al. |
| 2014/0277765 A1 | 9/2014 | Karimi et al. |
| 2014/0358291 A1 | 12/2014 | Wells |
| 2016/0223215 A1 | 8/2016 | Buda et al. |

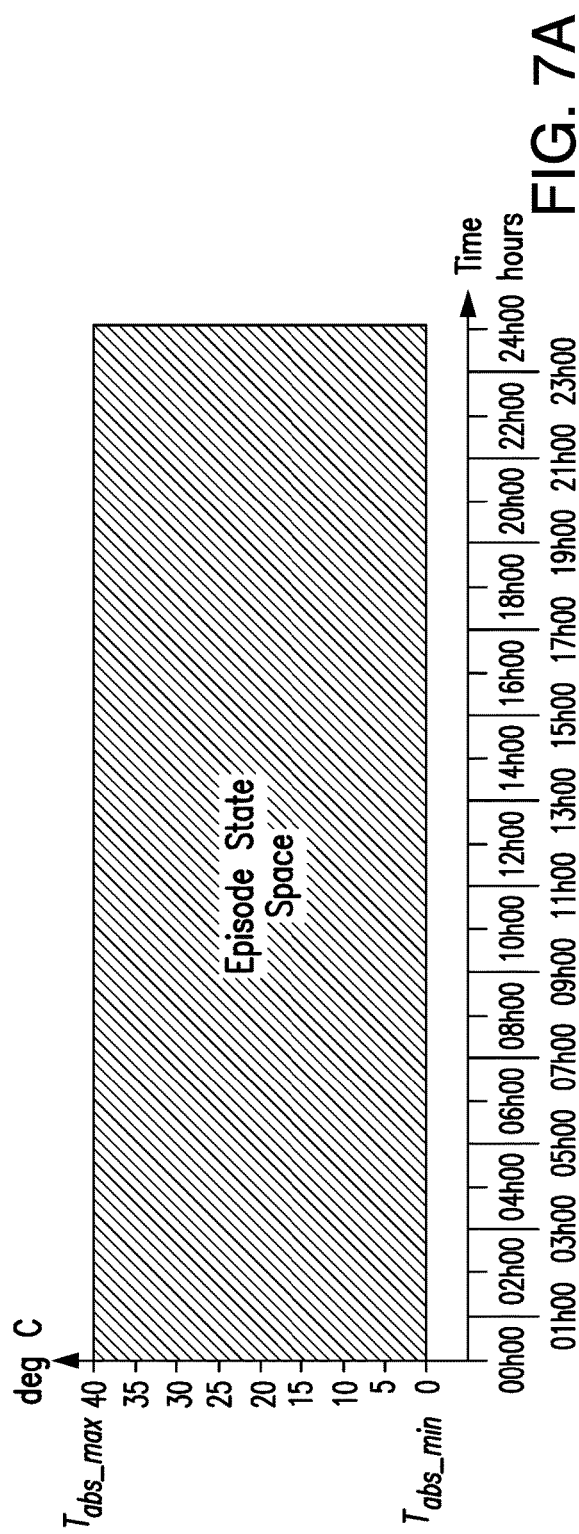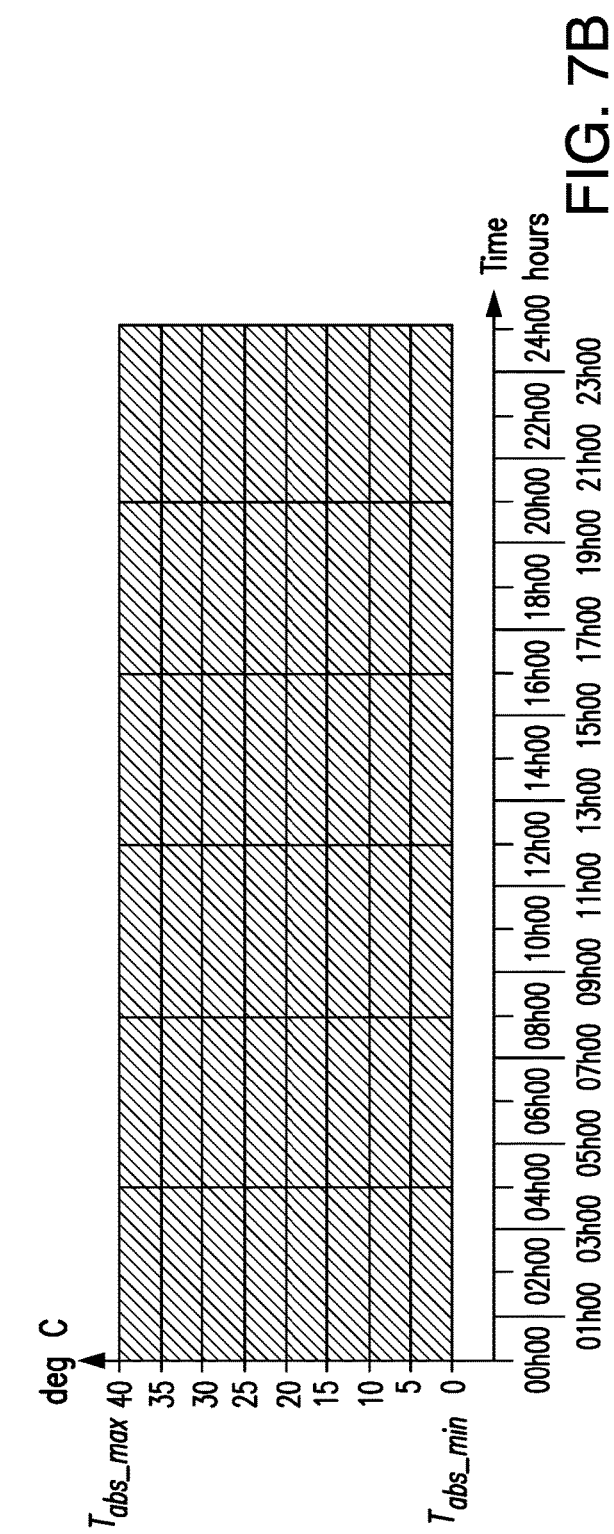

Comfort Map

B.
Resulting Control
Temperature Sequence

Comfort Map

Resulting Control
Temperature Sequence

US 10,571,876 B2

INTERIOR COMFORT HVAC USER-FEEDBACK CONTROL SYSTEM AND APPARATUS

The present U.S. Patent Application is a continuation of copending U.S. patent application Ser. No. 14/956,082, filed on Dec. 1, 2015, which claims benefit of each of the following applications: (a) U.S. Provisional Application No. 62/110,393, filed Jan. 30, 2015 and titled "Interior Comfort HVAC User-Feedback Control System and Apparatus"; (b) U.S. Provisional Application Ser. No. 62/110,344, filed Jan. 30, 2015 and titled "Interior User-Comfort Energy Efficiency Modeling and Control Systems and Apparatuses"; (c) U.S. Provisional Application Ser. No. 62/110,386, filed Jan. 30, 2015 and titled "Interior Volume Thermal Modeling and Control Apparatuses, Methods and Systems"; (d) U.S. Provisional Application Ser. No. 62/110,398, filed Jan. 30, 2015 and titled "Apparatuses, Methods and Systems for Comfort and Energy Efficiency Conformance in an HVAC System"; and (e) U.S. Provisional Application Ser. No. 62/110,379, filed Jan. 30, 2015 and titled "Operational Constraint Optimization Apparatuses, Methods and Systems"; the entire contents of each of the aforementioned applications are herein expressly incorporated by reference.

This application for letters patent document discloses and describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

RELATED APPLICATIONS

This application is related to and hereby incorporates the following applications by reference:

U.S. application Ser. No. 14/956,227, filed Dec. 1, 2015 and titled "Interior User-Comfort Energy Modeling and Control Systems and Apparatuses,"

U.S. application Ser. No. 14/955,971, filed Dec. 1, 2015 and titled "Interior Volume Thermal Modeling and Control Apparatuses, Methods and Systems,"

U.S. application Ser. No. 14/956,139, filed Dec. 1, 2015 and titled "Apparatuses, Methods and Systems for Comfort and Energy Efficiency Conformance in an HVAC System," and U.S. application Ser. No. 14/956,019, filed Dec. 1, 2015 and titled "Operational Constraint Optimization Apparatuses, Methods and Systems."

The entire contents of each of the aforementioned applications are hereby expressly incorporated by reference.

BACKGROUND

"Smart" thermostats are increasing in capability as well as in popularity among consumers, but they often have interfaces that are too complex for users to voluntarily interact with. Users often either leave an existing thermostat unchanged, or override it altogether. As a result, the capabilities of many smart thermostats are not fully exploited.

BRIEF DESCRIPTION OF THE DRAWINGS

The accompanying appendices and/or drawings illustrate various non-limiting, example, inventive aspects in accordance with the present disclosure:

FIGS. 7A and 7B shows an episode state space, according to some embodiments;

Figure 1:
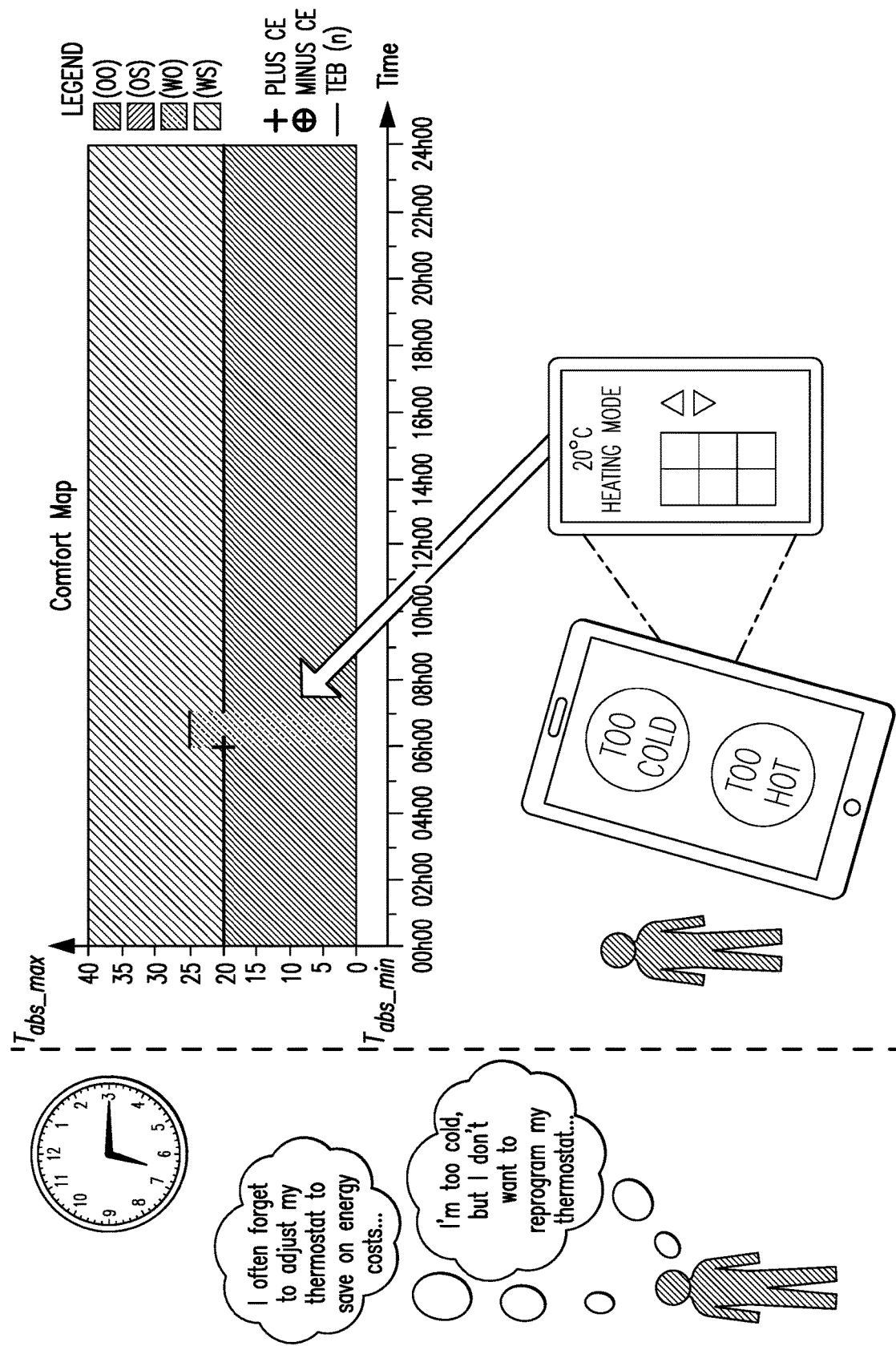
FIG. 1 provides a pictorial overview to aid in explaining some embodiments.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

DETAILED DESCRIPTION

In some embodiments, the INTERIOR COMFORT HVAC USER-FEEDBACK CONTROL SYSTEM AND APPARATUS as disclosed herein transforms direct user comfort feedback data as qualitative indications of comfort (e.g., "too warm" or "too cool") from a "user" (e.g., an "occupant" of a room or other conditioned interior space that is environmentally controllable via an HVAC system), received during one or more "comfort events," into a multi-variable data representation of the user's comfort such that the data can be used for subsequent environmental control operations involving and/or referencing the room, the user, and/or at least one attribute of the comfort event(s). This multi-variable representation is herein referred to as a "comfort map." As described herein, a comfort map can comprise a plurality (i.e., two or more than two) of non-overlapping sets of time-temperature pairs that collectively define a time-temperature parameter space, each set having at least one categorical designation. Accordingly, the comfort map can also be described as a multivariable representation of a user's comfort, specifically tracking time, temperature and a comfort characteristic—warm or cool comfort for a series of points or elements across an episode. Comfort map data can be used to generate a control temperature sequence or execution temperature trajectory, and can be modified by comfort event data that includes non-numeric input received from an occupant of the conditioned interior space.

Methods described herein can be used to adaptively control a heating, ventilating and/or air conditioning ("HVAC") system based on comfort events. In some embodiments, an intelligent agent or an intelligent system (hereinafter "system"), for example, including or in communication with a thermostat, controls a temperature of an interior space by operating an HVAC system according to an initial comfort map and/or an initial execution temperature trajectory (which may be thought of as a temperature setpoint sequence). An initial comfort map and/or an initial temperature setpoint sequence can be provided by: a commissioning agent (e.g., upon installation of the system), a cloud computing network, a local memory (e.g., containing temperature values and/or rules), a comfort map library/repository, a profile library, etc. (any of which may be locally stored, or stored within a cloud computing network ("the cloud")). In other embodiments, an initial comfort map or temperature setpoint sequence is not provided, and the system may determine an initialization temperature/sequence, or an occupant may provide an initialization temperature/sequence. In such embodiments, the system may generate an initial comfort map based on the system or occupant-specified initialization data. In still further embodiments, the system may ramp (e.g., apply heating or cooling to the interior space at a predetermined fixed or varying setpoint) until a first occupant feedback is received.

The system then receives a first feedback comfort data event from an occupant of an interior space (e.g., of a residential or commercial space), the first feedback containing either an indication that the occupant is too warm or that the occupant is too cool. An indication that the occupant is too warm may be referred to as a comfort characteristic user feedback data of the type: "user too warm." An indication that the occupant is too cool may be referred to as a comfort characteristic user feedback data of the type: "user too cool." Such feedback, along with the time at which the feedback was provided ($t_{CE}$) and an observed temperature of the interior space at the time of the feedback ($T_{CE}$, e.g., sensed by/accessed from a sensor or an aggregation of a plurality of sensors of the HVAC system), is collectively herein referred to as a "comfort event." The comfort event occurs during an "episode"—a fixed subdivision of time over which a replicatable temperature sequence(s) or pattern(s) of temperatures over time can be established during the execution of an instantiation of a comfort map. In some embodiments, an episode is one day. In other embodiments, an episode or a "day" may be any multiple or subdivision of a period of time (a week, a month, 4 hours, etc.). Based on the comfort event, the system defines a two-dimensional comfort event window in a time-temperature parameter space. The comfort event window includes the time/temperature datapoints supplied by the comfort event, and extends in at least one direction in time and/or temperature from a comfort event reference point, as discussed herein.

Many geometries of the comfort event window are contemplated by the present disclosure (e.g., circular, polygonal, rectangular, triangular, portions thereof, combinations thereof, and/or the like). A comfort event window may be symmetrical or asymmetrical in time about a comfort event reference point, for reasons that will become apparent herein. A comfort map can then be modified or generated within the time-temperature parameter space, based on the initial comfort map (or initial setpoint sequence, if any) and the comfort event window. Based upon data contained within the comfort map, the system then updates, modifies or defines a temperature control sequence or execution temperature trajectory (e.g., for immediate use or for use in subsequent episodes). Thus, the execution temperature trajectory may be said to be based on and derived from the comfort event data and the updated comfort map. Thus, the resulting control temperature trajectory can comprise an improved representation of an occupant's comfort and/or temperature(s) associated with occupant comfort. Systems described herein can thus process instantaneous, real-time user comfort feedback data to generate and/or modify a control temperature sequence, without the need to exchange (e.g., receive and/or display) numeric information (e.g., temperature) with an occupant. In other words, in some embodiments, the actual temperature of a temperature conditioned space is never displayed to an occupant.

Comfort can be defined as a physical or psychological "ease." The comfort experienced by an occupant of an interior space is subjective, in that it can depend on a person's unique preferences, and users of HVAC systems value comfort (i.e., "thermal comfort") very highly among other valued properties of HVAC systems/interfaces, such as energy efficiency and ease of use of the thermostat. Factors that can contribute to occupant comfort, and that can be controlled by an HVAC system, include air temperature, mean radiant temperature, relative air velocity, and vapor pressure in ambient air. Factors that can contribute to occupant comfort, but that cannot be controlled by an HVAC system, include the activity level of the occupant, thermal resistance of his clothing, skin moisture, occupancy of the space, etc. Occupants can exhibit learned behaviors with regard to their interaction with a thermostat. For example, when an occupant wakes up in the morning and is uncomfortably cool, he/she might go straight to the thermostat to make an adjustment (raise the setpoint) to remedy his discomfort, and be quickly—perhaps within a few minutes—"rewarded" for his interaction with the thermostat by some indication that the HVAC system has come on (or turned off, depending upon the instruction). This indication may be in a visual form (e.g., via the thermostat display) or audible form (e.g., the sound of the furnace blower coming one), or it might be a perceptible change in temperature or airflow, etc. Such indications may be said to "condition" an occupant's response to his discomfort (through what may be called "reinforcement learning"), since he/she knows that interacting with his thermostat will quickly alleviate his discomfort.

There is no analogous short-term incentivization, however, for an occupant to interact with his thermostat to improve HVAC system energy efficiency, for example since a reduced energy bill might arrive several days or weeks after a volitional energy-reducing adjustment to a thermostat, and hence be too remote in time to be perceived, on a psychological level, as a "reward" that conditions the behavior. Furthermore, users of programmable thermostats often deprogram them or override them, in favor of setting static "hold temperatures" instead, or shutting the system off when leaving for the day, etc., due to convenience, lack of motivation, perceived complexity of the interface, etc. . . . Thus, occupants may not be as energy-efficient in their use of their thermostats as they could be.

The concept of thermal equilibrium (e.g., as represented by a thermal equilibrium boundary, "TEB," between temperatures that are too warm and temperatures that are too cool) can be described as that state in which the occupant cannot determine whether the space would be more comfortable if warmer or cooler. The state of thermal equilibrium may be a single temperature or over a range of air temperatures and is dependent upon a number of factors, including individual preferences, clothing, physical activity, humidity, rate of air movement and mean radiant temperature in the occupied space. Temperatures at which thermal equilibrium is achieved (e.g., as defined by a TEB sequence) can vary with time, e.g., dependent upon the time of day as it relates to activity. For example, some individuals prefer a cooler air temperature at times when they are asleep than when they are showering. A TEB may be understood to be a time sequence of temperatures that represent a thermal equilibrium, as described in greater detail below.

When asked to program a conventional thermostat (whether in single setpoint mode or schedule mode), individuals make "educated guesses" about temperatures that will be "comfortable," and can be influenced by their perception of what temperature values "should" be comfortable. In reality, there is a range of temperatures over which the occupants would consider themselves "comfortable." Without extensive experimentation by the occupants, it will generally not be known whether a temperature at a given time could be lowered (raised in cooling) without causing discomfort. Furthermore, experimentation by the occupants to determine a balance between comfort and saving energy is a conscious activity requiring significant time, effort and concentration. Such activities are unlikely to be conducted by the occupants.

When there is no perceived discomfort, the occupant is not likely to change the temperature and may forget about the system altogether. There is something "special" about discomfort which triggers the occupant to think about the system and take action to modify the reference temperature. A feature of the present disclosure is that the system can process user feedback to make decisions regarding estimated occupant comfort, and can also perform the experimentation required to save energy, for the occupants who, in general, interact only to correct for comfort. Systems described herein can also function without the need to display a temperature/setpoint value to an occupant interacting with the system. Systems described herein can, depending on the implementation, implement dynamic, real-time and/or near real-time changes to promote comfort based on comfort user feedback data (or "comfort event data") received from an occupant via non-numerical/categorical input.

The U.S. Department of Energy estimates that for a space heating application in which heat is required to maintain a temperature, energy usage increases on average approximately 6% for each degree (Celsius) of increase in the reference temperature in a heating application (see, for example, Lorne W. Nelson, J. Ward MacArthur, "Energy Savings Through Thermostat Setback", AL-78-1, 1978, published in ASHRAE Transactions, Volume 84, Part 2, the entirety of which is herein expressly incorporated by reference). Similar results are assumed for cooling. There is an opportunity to save energy by reducing temperatures in the heating mode (or increasing them in the cooling mode) when comfort is not the main consideration, such as periods where the conditioned space is known to be unoccupied. Since there is a range of temperatures over which thermal equilibrium applies, there is an opportunity to save energy by operating at the lowest temperature considered comfortable by the occupants with the system in the heating mode, or warmest considered comfortable by the occupants with the system in the cooling mode at those times where the space is occupied.

Unfortunately, there is no stimulus analogous to that of discomfort in a conventional HVAC system that can trigger a conditioned response to save energy, for example because the delay between the action and the reward (monetary or otherwise) is too long. When an action is taken by an occupant to save energy, the delay between the action and receipt of the (monetary or other) reward is typically on the order of days to weeks to even months. By this time, the occupant is unlikely to relate savings (even if the amount of savings is disclosed) to any specific event generating the savings.

Furthermore, the act of changing a temperature to "explore" whether a warmer or cooler temperature would also be acceptable in conditions where a space is occupied may actually cause discomfort if the occupant guesses wrong. This negative reinforcement serves to dissuade the occupants from making adjustments to save energy. It should not be a surprise that most occupants only interact with the HVAC system to improve comfort.

The disclosed system works to minimize the amount of interaction required by the system from the occupant(s) to establish a conditioned space considered comfortable over most, if not all situations, while ensuring a sufficient amount of occupant interaction such that those requirements can be determined in detail. A system that requires significant occupant interaction to maintain comfort will not be well received by occupants, whereas one that does not promote enough diversity in the trajectory to save energy will not be viable from an energy conservation perspective.

As described further below, time varying conditions of thermal equilibrium, or "comfort," are episodic—a basic pattern emerges day over day, particularly over days considered similar to one another. Periods of time for which a similar pattern of preferred temperature vs. time emerge are referred to herein as a "profile." The profile includes comfort map data, appropriate profile selection data—the time periods that a profile should be used, as well as other system comfort data. In some implementations, a profile can describe/correspond to a traditional 24-hour day (or portion thereof). Some example profile configurations are:

Workday
School day
Saturday
Wednesday
Holiday
Evening
Morning
Vacation Day
Workout Day
Workday Evening
Friday Evening
Workday Morning
Workday Afternoon The process of planning a strategy for and gaining the experience of a particular profile is referred to as an "episode" of that profile. For example, a profile may include several groups of data, such as a full or partial comfort map for use during an episode, the days, segments of days that a given profile is appropriate for, profile comfort window operational time/temperature characteristics (described in greater detail below, etc. . . . In such embodiments, at the end of the episode, the comfort map updated with comfort event data from the episode, is stored back into the appropriate profile. Accordingly, the episode's comfort learning is ready for use again the next day the system selects the particular profile.

Many residential thermostats and building energy management systems incorporate programmable schedules which provide the capability for the building occupants or managers to define an initialization temperature sequence as a function of time over the course of a day to reflect the expected activity in the occupied space, rather than a single setpoint temperature. The basis for this is that the occupants may have a good idea in their mind of a schedule over time which could be appropriate for the particular occupancy pattern of the space for a given profile. Specifying a time-varying initialization temperature sequence which the system can repeat for a profile can permit the occupants to capture at least some of the energy savings available while simultaneously meeting requirements for comfort. But actual implementation often requires a significant amount of user time, and experiementation to achieve viable results. Ultimately, while programmable thermostat operation uses the initial temperature sequence as the HVAC control sequence, the system described herein can use the initial temperature sequence as one possible input to create a comfort map. In contrast to a programmable thermostat, the system described herein utilizes the features/functionality of a comfort map to generate an execution temperature trajectory for driving HVAC operation.

For instance, in a residential application, it may be determined that during a working day when the occupants are at home and are actively in the space (awake and doing activities), a temperature of 22.5° C. is considered comfortable by all. If however it is known that the occupants are generally not home between the hours of 10:00 AM and 3:00 PM, the 6% rule described above would suggest that one way to reduce energy usage is to reduce the temperature in the occupied space (heating mode) significantly to, say 17.5° C. between 10:30 AM and 2:30 PM, returning the temperature to 22.5° C. at 2:30 PM in anticipation that occupants should be returning home at 3:00 PM. Similarly, if it is known that the occupants prefer a cooler temperature (perhaps 20° C.) when sleeping, and they generally are asleep between 10:00 PM and 6:00 AM the next morning, it would be advantageous from both a comfort and energy perspective to have the comfort control system automatically reduce the space temperature to 20° C. at 10:00 PM and restore the temperature to 22.5° C. at 5:30 AM the next morning.

Figure 2:
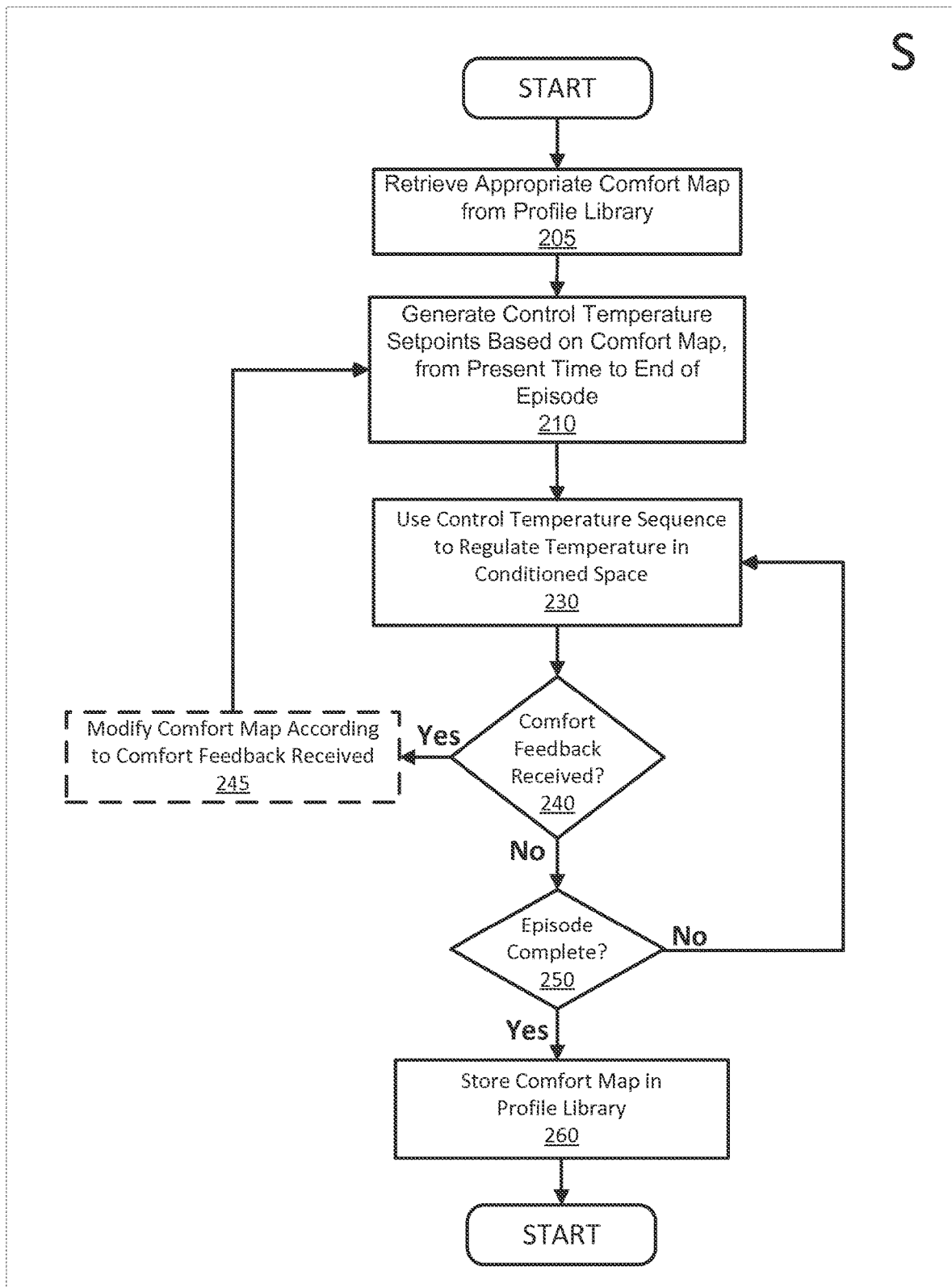
FIG. 2 is a flow diagram illustrating a process flow according to some embodiments.

Embodiments of the present disclosure simplify and improve the above-described occupant interaction with HVAC systems in several ways, allowing for streamlined and more effective comfort and energy efficiency management. For example, in some embodiments, occupant inputs are "qualitative" or categorical/non-numeric—an occupant indicates, via an interface, that he/she is either "too cold" or "too warm" as comfort event data, without any need to know the actual temperature setpoint at that moment in time or the temperature to which he/she would like to adjust. This may be accomplished, for example, via a smartphone app running on the occupant's mobile device (see FIG. 1) or via a web-based platform, or at the thermostat interface itself. The system thereby takes quantitative adjustments to the thermostat out of the occupant's hands. Such methods are desirable, for example, since it may be easier for an occupant to decide that he/she is "too warm" or "too cool," rather than to decide whether he/she would prefer the temperature to be 22° C., or 21° C., or 21.5° C., etc., instead of 20° C. Furthermore, while in a conventional system a user may elect to move the temperature setpoint from 20° C. to 22° C. when he/she feels too cool, it may be true that 21° C. would also have eliminated his discomfort and/or made him "comfortable," but at a reduced energy cost. The present disclosure describes HVAC system operation on a continuous feedback loop, episode over episode, and can be summarized for some embodiments, by way of example, as follows (and as shown in the flowchart of FIG. 2):

1. At the beginning of an episode, the system accesses/retrieves a comfort map (at 205) from a profile associated with a time period a profile library (e.g., stored locally or in "the cloud"). Based on the current day or time, the system selects the profile applicable to a categorical type of day (e.g., weekday, weekend, day of week, etc.) or with a current day (or portion thereof). The comfort map contains time, temperature and categorical information including a comfort characteristic data for a series of elements included in the map. In one implementation, a comfort characteristic represents an occupant's perceived comfort at a point in time for a given temperature on a comfort map representing an episode.
2. The categorical information in the comfort map is used, at 210, to generate an execution sequence of control temperature setpoints from the present time until the end of the episode.
3. The system utilizes the control temperature setpoint sequence, at 230, as a reference to control the temperature of the conditioned space, utilizing an HVAC system.
4. During the actual episode (i.e., as it plays out in time), occupants can dynamically provide user comfort feedback (e.g., via a "comfort event") when discomfort is experienced—e.g., categorical feedback in the general form "too cool" or "too warm," with regard to the temperature experienced by the occupant at a given time). This feedback may be used to derive comfort characteristic data that is used to determine how to update the comfort map being executed during the episode. In other words, data received during a comfort event ("comfort event data") can include temperature increase request data or temperature decrease request data.
5. When comfort feedback data is received (i.e., at 240) by the system of the disclosure (e.g., via a "comfort event"), the system can modify or "update" a region of the comfort map (at 245) in a manner described herein (in addition or alternatively, said update, in some embodiments, being applied to one or more profiles associated with the comfort map at the end of the episode), to reflect the comfort feedback data received. In some embodiments, the Comfort Map will be modified at 245 if the comfort feedback data received at 240 adds new information not already contained within the Comfort Map, or conflicts with information already contained within the Comfort Map (for example, as described in greater detail below). Whether or not the map is so modified at 245, the process repeats from step (2) (box 210 in FIG. 2) above.

6. Steps (210)-(250) above are repeated until the end of the temporal episode. At that time (i.e., when the answer at 250 is Yes), the resulting (e.g., "updated") comfort map is stored back into the profile library (at 260) for subsequent use. Accordingly, the learning from the comfort map/comfort events is stored back into the profile and as such, is available for use the next time the particular profile and corresponding comfort map is selected by the system for use in an episode. An execution temperature trajectory can then be derived from the resulting/updated comfort map and executed when appropriate (e.g., during the next relevant episode or portion thereof).

To accomplish the above processs requires a variety of functionality and system modules that are described in greater detail in the sections that follow.

Figure 3:
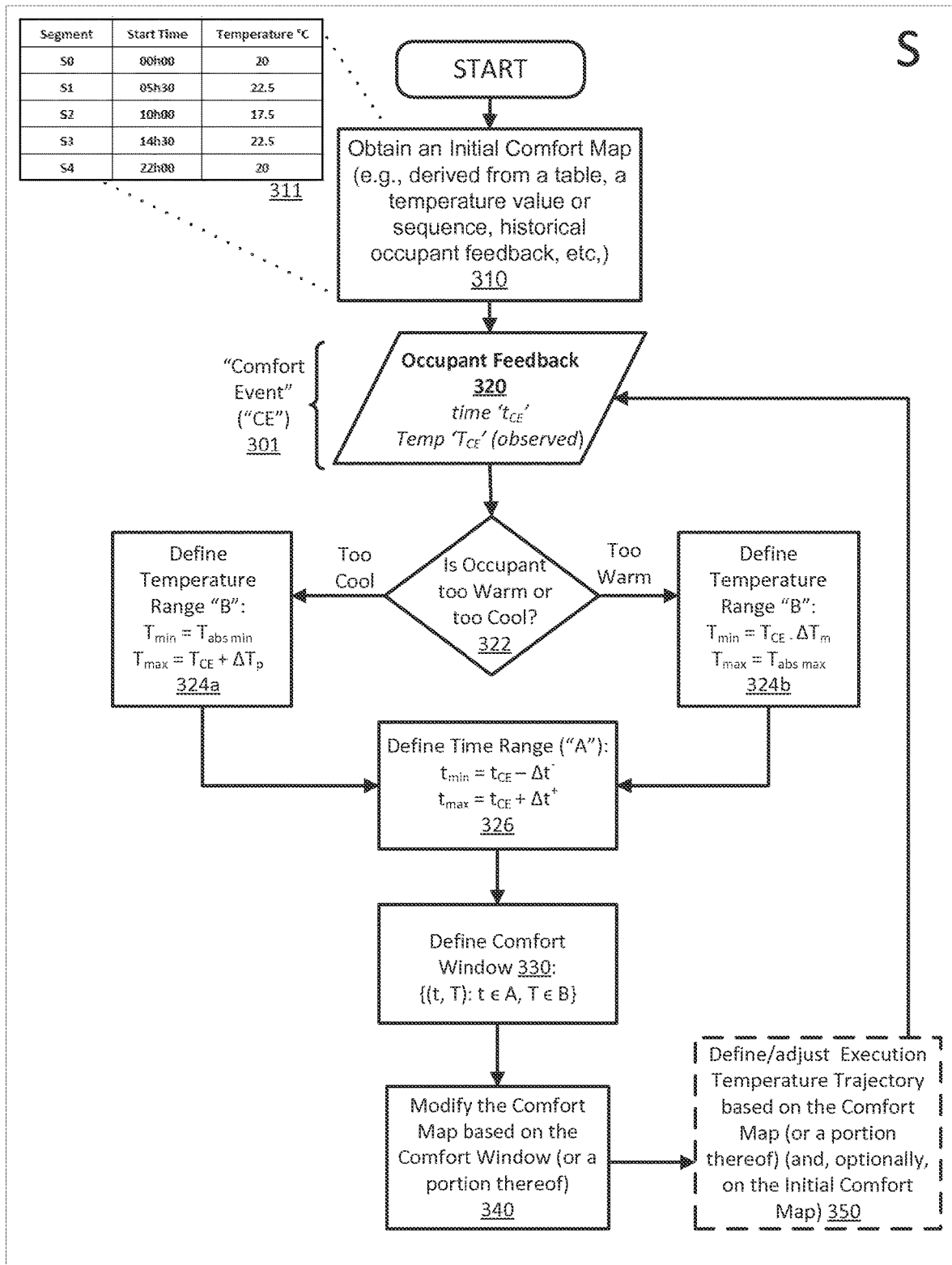
FIG. 3 is a flow diagram illustrating a detailed process flow according to some embodiments.

FIG. 3 illustrates a process flow according to some embodiments, describing aspects of how a comfort map is updated. The comfort map can be accessed from a particular profile associated with a particular day or time. Alternately, the comfort map obtained, at 310 may be generated (e.g., derived from a table (as shown in Table 311 of FIG. 3), a temperature value or sequence, historical occupant feedback, a locally stored library/repository, one or more temperature assignment rules, etc.). At 320, a comfort event "CE" 301 occurs, wherein an occupant provides user comfort feedback data 320 (e.g., an indication of "too cool," or "too warm," or a "PLUS" or "MINUS" event, respectively) to the system at time '$t_{CE}$' and at a temperature, substantially concurrently observed or accessed by the system, of '$T_{CE}$'. The time/temperature pair ($t_{CE}$, $T_{CE}$) may be referred to as a "comfort event reference point," and may be used to identify a reference point on the comfort map and an associated comfort characteristic (i.e., a "reference point comfort characteristic"). In some embodiments, a "reference point comfort characteristic" is derived from the comfort event data and/or can be used for updating the comfort map, as discussed further below. Depending upon whether the occupant has indicated that he/she is too warm or too cool (see 322), the system accesses operational variables or parameters to define a temperature range "B" (also referred to herein as $\Delta T$) in one of two ways, defined as follows:

When the Occupant is Too Cool:

When the occupant has indicated that he/she is too cool, temperature range B is defined, at 324a, to have a minimum, $T_{min}$, equal to an "absolute minimum" value of the system ($T_{abs\ min}$). $T_{abs\ min}$ may correspond to a practical limit, for example a temperature below which the HVAC system is not permitted to operate because the pipes in the home could freeze (e.g., 20° F.). In other embodiments, $T_{abs\ min}$ may correspond to the lowest temperature measurable by the HVAC system (e.g., based on the sensor network employed). In still other embodiments, $T_{abs\ min}$ may correspond to the lowest temperature achievable by the HVAC system (e.g., by an air conditioning unit). Also, when the occupant has indicated that he/she is too cool, temperature range B is defined, at 324a, to have a maximum, $T_{max}$, equal to the temperature observed by the system at or near time $t_{CE}$ ($T_{obs}$ or $T_{CE}$) plus an additive offset ($\Delta T_p$), where the additive offset ($\Delta T_p$) may be set or defined to reflect an incremental temperature range over which it is likely (or certain) that the occupant would also feel too cool (see FIG. 11 and corresponding discussion, below). In some embodiments, $T_{abs\ min}$ and/or $\Delta T_p$ are predetermined, hard-coded values within the system (e.g., programmed upon commissioning of the system). In other embodiments, $\Delta T_p$ is an adaptable design parameter that can be modified by the user and/or dynamically by the system. In some embodiments, $T_{max}$, e.g., as used in FIG. 3, is a value derived from $T_{CE}$ and ($\Delta T_p$).

Figure 12:
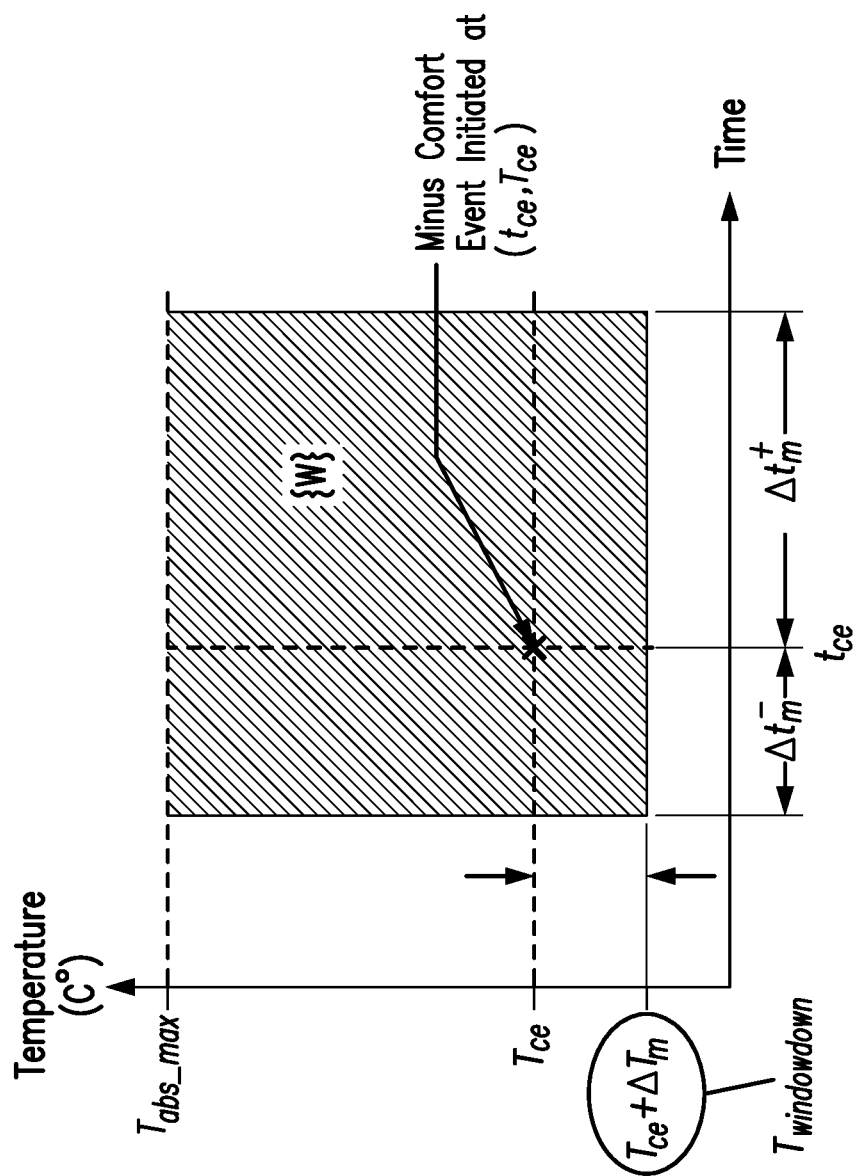
FIG. 12 is a chart (time versus temperature) of a "MINUS" comfort event window, according to some embodiments.

When the Occupant is Too Warm:

When the occupant has indicated that he/she is too warm, temperature range B is defined, at 324b, to have a minimum, $T_{min}$, equal to the temperature observed by the system at or near time $t_{CE}$ ($T_{obs}$ or $T_{CE}$) minus a subtractive offset ($\Delta T_m$), where the subtractive offset ($\Delta T_m$) may be set or defined to reflect a temperature range over which it is likely (or certain) that the occupant would also feel too warm (see FIG. 12 and corresponding discussion, below). Also, when the occupant has indicated that he/she is too warm, temperature range B is defined, at 324b, to have a maximum, $T_{max}$, equal to an "absolute maximum" value of the system ($T_{abs\ max}$). $T_{abs\ max}$ may correspond to a practical limit, for example a temperature above which the HVAC system is not permitted to operate for safety or energy efficiency reasons. In other embodiments, $T_{abs\ max}$ may correspond to the highest temperature measurable by the HVAC system (e.g., based on the sensor network employed). In still other embodiments, $T_{abs\ max}$ may correspond to the highest temperature achievable by the HVAC system (e.g., by a furnace). In some embodiments, $\Delta T_m$ and/or $T_{abs\ max}$ are predetermined, hard-coded values within the system (e.g., programmed upon commissioning of the system). In other embodiments, $\Delta T_m$ is an adaptable design parameter that can be modified by the user and/or dynamically by the system.

Figure 11:
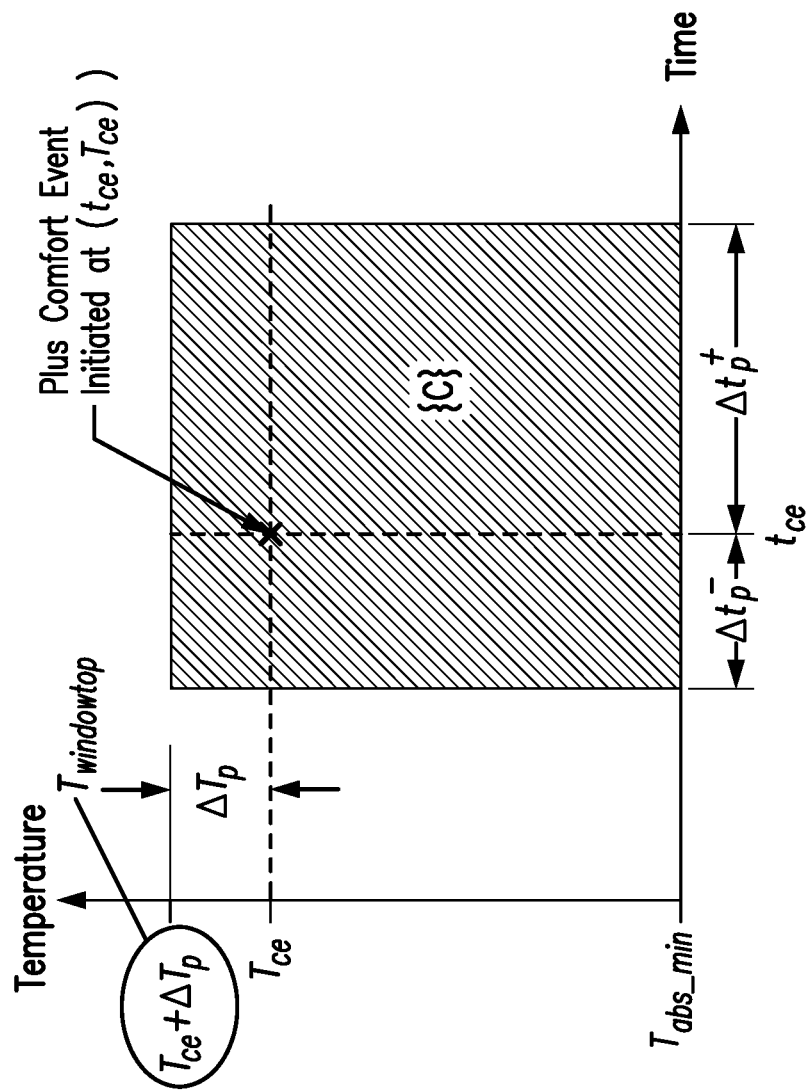
FIG. 11 is a chart (time versus temperature) of a "PLUS" comfort event window, according to some embodiments.

Next, at 326 of FIG. 3, the system defines a time range "A" (which will also be used to define the width of a comfort event window) having a minimum endpoint in time and a maximum endpoint in time. The minimum is defined as the time of the comfort event, $t_{CE}$, minus a first "offset' value $\Delta t^-$. In some embodiments, $\Delta t^-$ is a period of time (for example, a number of minutes) preceding the comfort event, during which the occupant is estimated (or known) to have been experiencing the same type of discomfort that triggered the comfort event (i.e., the period of time preceding the comfort event during which the occupant was, or was likely, too warm or too cool). In this way, the system seeks to compensate for a delay in the occupant taking action (via the comfort event), by making modifications to the thermostat in accordance with what it determines to be the occupant's "intent." In some embodiments, $\Delta t^-$ is measured in seconds or minutes, for example about 20 minutes. This first offset time can be selected empirically, randomly, algorithmically, or based on actual knowledge (for example, by an indication from the occupant), and can also be modified autonomously (i.e., by the system) and/or manually by an occupant. The maximum of time range A is defined as the time of the comfort event, $t_{CE}$, plus a second "offset' value $\Delta t^+$. This second offset time can also be selected empirically, randomly, algorithmically, or based on actual knowledge (for example, by an indication from the occupant). As shown in FIGS. 11 and 12 (discussed in further detail below), $\Delta t^-$ and $\Delta t^+$ can be selected to correspond with a specified interval (e.g., denoted in FIG. 11 as $\Delta t_p^-$ and $\Delta t_p^+$ or denoted in FIG. 12 as $\Delta t_m^-$ and $\Delta t_m^+$) extending before and after the time that the comfort event was initiated (respectively). In some embodiments, either or both the first offset time and the second offset time values can be set to zero, and it is to be understood that the first offset time value and the second offset time value can differ.

Next, at 330, the thermostat defines a two-dimensional comfort event window, in time-temperature parameter space, as $\{(t, T): t \in A, T \in B\}$. In some embodiments, the comfort event window spans a time period ranging from: (1) the comfort map reference point time (e.g., $t_{CE}$) minus an offset (e.g., $\Delta t^-$); and (2) the comfort map reference point time (e.g., $t_{CE}$) plus an offset (e.g., $\Delta t^+$) and over temperature ranges B defined by the comfort event feedback characteristic (e.g., the range $[T_{abs\_min}, T_{windowtop}]$ where $T_{windowtop}$ is determined by adding $\Delta T_p$ to $T_{CE}$, in the case of "Too Cool" and $[T_{windowbottom}, T_{abs\_max}])$, where $T_{windowbottom}$ is determined by subtracting $\Delta T_m$ from $T_{CE}$, in the case of "Too Warm". For purposes of explanation, $\Delta T_p$ may be referred to as $\Delta T$ for plus events, and $\Delta T_m$ may be referred to as $\Delta T$ for minus events.

At 340, the comfort event window (or a portion thereof, e.g., $T_{windowtop}$ $T_{windowbottom}$, etc.) defined at 330 is used to modify/update the comfort map. In some embodiments, modifying/updating the comfort map includes overlaying the comfort event window defined at 330 onto the comfort map and updating/setting the comfort characteristic of each element of the comfort map within the range specified by the comfort event window.

In some embodiments, modifying/updating the comfort map includes adjusting a TEB (as described in greater detail below) and associated comfort map comfort characteristics as follows:
  (1) accessing a $\Delta T_p$, $\Delta t^-$ to $\Delta t^+$ parameters;
  (2) adding $\Delta T_p$ to $T_{CE}$ to get $T_{windowtop}$;
  (3) generating a new TEB on the comfort map at each point/element between $\Delta t^-$ to $\Delta t^+$ if a current TEB−$T_{windowtop}$ is a positive number for the point; and
  (4) updating the comfort charactistic of all points/elements between $\Delta t^-$ to $\Delta t^+$ between the new TEB and the current TEB.

In some embodiments, modifying/updating the comfort map includes adjusting a TEB (as described in greater detail below) and associated comfort map comfort characteristics as follows:
  (1) accessing a $\Delta T_m$, $\Delta t^-$ to $\Delta t^+$ parameters;
  (2) subtracting $\Delta T_m$ from $T_{CE}$ to get $T_{windowbottom}$;
  (3) generating a new TEB on the comfort map at each point/element between $\Delta t^-$ to $\Delta t^+$ if a current TEB−$T_{windowbottom}$ is a positive number for the point; and
  (4) updating the comfort charactistic of all points/elements between $\Delta t^-$ to $\Delta t^+$ between the new TEB and the current TEB.

A comfort map, described according to the process flow shown in FIG. 3, comprises a plurality of adjacent rectangular regions or in some implementations "points" or "elements" in time-temperature parameter space, as further described and shown herein. In some embodiments, modifying/updating the comfort map includes updating a comfort characteristic for one or more (up to all) points within a comfort map window. In some embodiments, modifying/updating the comfort map profile includes replacing a "first" (e.g., pre-existing/stored) comfort map with an updated/modified comfort map at the end of an episode. The system may then, at 350, define a temperature control sequence or execution temperature trajectory based on the comfort map modified at 340. In some embodiments, the comfort map is not modified, or is only partially modified, in response to a comfort event. For example, when the comfort event data includes "user too warm" current comfort feedback data, and the system is already operating to cool to a setpoint below the observed temperature at the time of the comfort event, then the setpoint corresponding to the comfort event window corresponding to the comfort event may not change, and similarly, a comfort map comfort characteristic (e.g., "warm" or "cool,") associated with one or more points within the comfort event window corresponding to the comfort event may also not change.

In some embodiments, a comfort map stored in a comfort map profile library or in a profile maintains a dynamic representation of an occupant's history of comfort event interaction with the system in order to improve comfort. A comfort map comprises an episode state space including a plurality of elements (also "points," "datapoints," or "pixels"). Each element has a comfort characteristic and in some implementations is assigned membership in one of at least two sets, for example:

A set representing those elements, regions/points of the episode state space considered with a "warm" comfort characteristic by the system. This set is referred to herein by $\{W\}$, and may be an "upper" region of the comfort map. Occupants experiencing these time-temperature pairs would judge them to be warm, which may trigger in the occupants a conditioned response to correct the situation if a actual temperature drifted too far into the set. Elements within the warm set may be said to have a comfort map comfort characteristic of "warm."

A set representing those elements regions/points of the episode state space considered with a "cool" comfort characteristic by the system. This set will be referred to herein by $\{C\}$, and may be a "lower" region of the comfort map. Occupants experiencing these time-temperature pairs may judge these regions to be cool, and this judgment may trigger a conditioned response to correct the situation if a actual temperature drifted too far into the set. Elements within the cool set may be said to have a comfort map comfort characteristic of "cool."

Figure 8:
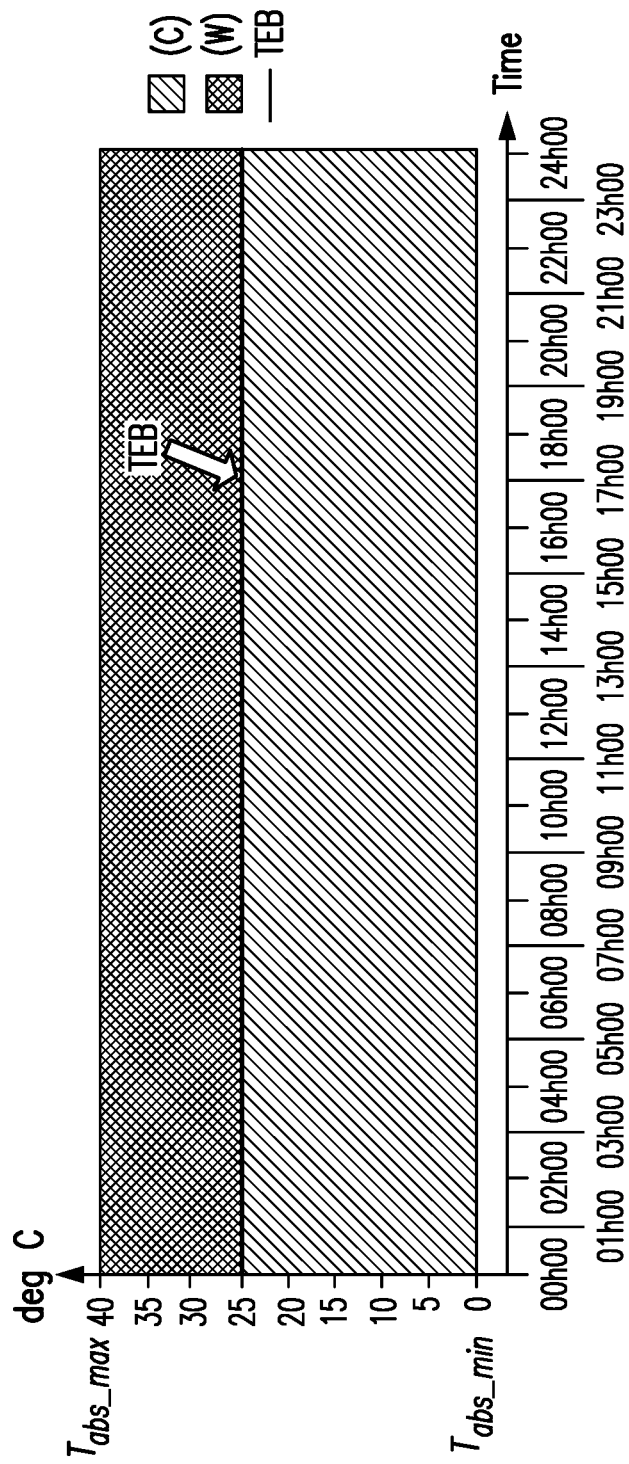
FIG. 8 is a chart (time versus temperature) of a comfort map representation of a single setpoint, showing the thermal equilibrium boundary, according to some embodiments.

Other sets also contemplated by the disclosure can include: slightly warm, moderately warm, extremely warm, slightly cool, moderately cool, extremely cool, etc. Neither of the designations ($\{W\}$ and $\{C\}$) represents a request for action per-se, but rather provides comfort characteristic information. The union of sets $\{W\}$ and $\{C\}$ cover the time and temperature range of the episode as the episode state space (every element is assigned, and assigned to only one set). For any fixed time, there is a boundary temperature above which all time-temperature pairs (or "elements") are in the set $\{W\}$ and below which all time-temperature pairs (or "elements") are considered to be in the set $\{C\}$. The boundary temperature for a given point in time is referred to as the thermal equilibrium boundary for that point in time. The sequence of these boundary temperatures may be considered the thermal equilibrium boundary, denoted "TEB" or TEB(t) (or thermal equilibrium boundary sequence TEB(n) in the case of a discrete-time implementation) and represents a temperature at time t which is neither too cool nor too warm, i.e. a temperature that the system (e.g., an intelligent agent or an intelligent system) determines/estimates that the occupants will likely consider "comfortable" (i.e., neither too warm nor too cool) and thus would not be prompted to interact with the system. In other words, the TEB can be interpreted as the coolest temperature the occupants would consider comfortable at a given time in the heating mode and the warmest temperature the occupants would consider comfortable at a given time in the cooling mode. The TEB may also be referred to as a boundary of "thermal neutrality." As the system is specified, in some embodiments, the location of this boundary temperature is dependent upon the system mode (heating or cooling). In the heating mode, the boundary temperature is designated to be in the set {W}, whereas in the cooling mode it is designated to be in the set {C}. In some embodiments, the thermal equilibrium boundary (TEB) between the sets {C} and {W} in a comfort map can be used as a control temperature sequence/execution temperature trajectory. The TEB is shown graphically in FIG. 8, depicting a comfort map for which all elements for all temperatures greater than 25 C.° (above the TEB) are in the set {W} and all elements for all temperatures less than 25 C.° (below the TEB) are in the set {C}.

The comfort map may include a plurality of comfort event windows representing all comfort events that have occurred during an episode, since the installation/commissioning of the system, or a subset thereof (e.g., for computational economy, or because the occupant has changed, etc.). When the HVAC system is in heating mode, the system (e.g., housed within a thermostat) may favor or require temperature trajectories that "avoid" the cool region {C}. When the HVAC system is in cooling mode, the system may favor or require temperature trajectories that "avoid" the warm region {W}. The comfort map comfort characteric data can provide a basis or input for subsequent execution temperature trajectory decisions to be made by the system. Where only one comfort event has occurred, the comfort map data may be viewed as "sparse," however the approximation of an occupant's comfort can improve dramatically after relatively few episodes with some additional user interaction.

In some embodiments, an episode may execute a comfort map corresponding to a single "profile" (as discussed above). In other embodiments, an episode may be executing comfort map segments corresponds to a series of profiles that are aggregated together (e.g., morning, afternoon and evening profiles).

For embodiments described herein, the term "cool" is used to refer to a perception that the temperature is uncomfortably low, or below a temperature at which a user or occupant is comfortable, and the term "cool" is understood to be interchangeable with terms such as cold, chill, bracing, brisk, etc. The term "warm," as used herein, is used to refer to a perception that the temperature is uncomfortably high, or above a temperature at which a user or occupant is comfortable, and the term "warm" is understood to be interchangeable with terms such as hot, muggy, etc.

In most embodiments, an "interior space," for which comfort events can be generated, refers to any spatial volume whose interior can be conditioned by an HVAC system. Examples include a residential dwelling (or any subdivision thereof, such as a room, foyer, hallway, closet, garage, basement, attic and/or other closed, substantially closed or open volume, for example as may be defined by walls, ceilings, floors, etc. and including windows, doors, partitions, chimneys, etc.), a commercial building (or any subdivision thereof) and/or an industrial space (or any subdivision thereof). In other embodiments, the "interior space" refers to a refrigerator. In other embodiments, the "interior space" refers to a data center.

Figure 4:
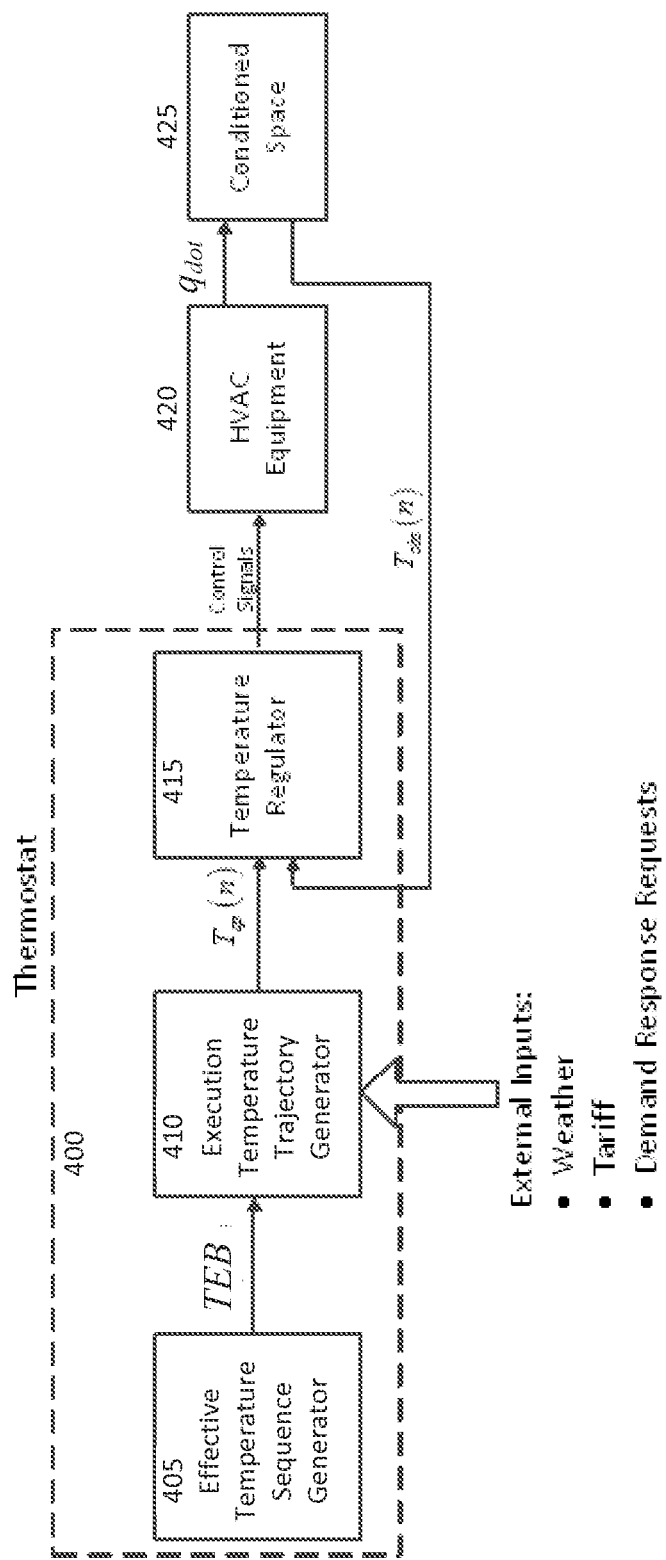
FIG. 4 is a temperature control system block diagram, according to some embodiments.
Figure 5:
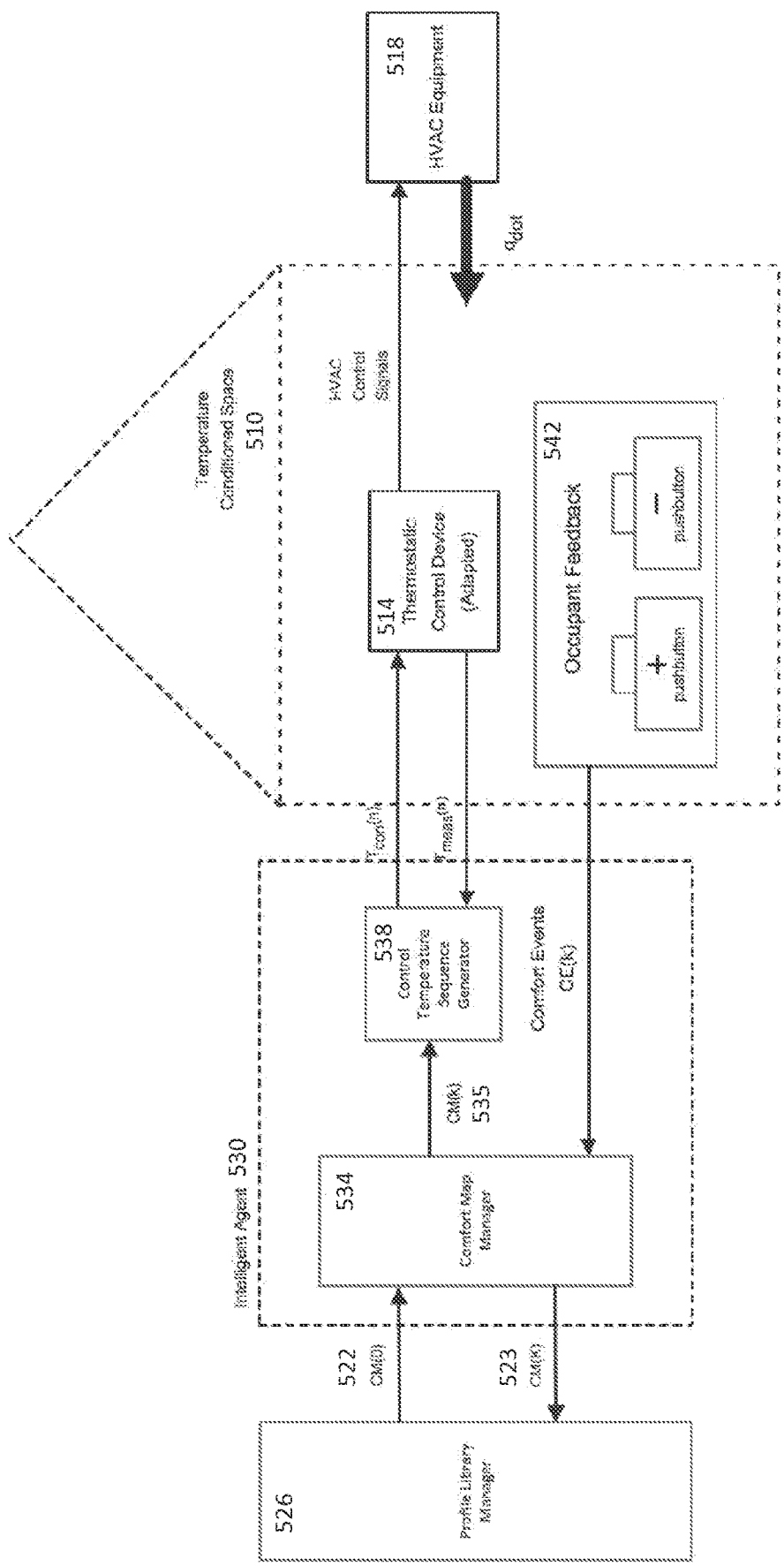
FIG. 5 is a temperature control system block diagram, showing component interconnectivity across a distributed system, according to some embodiments.

FIGS. 4 and 5 present two implementations of a temperature control system according to embodiments described herein. FIG. 4 shows a centralized, localized comfort map management thermostat implementation, while FIG. 5 shows an implementation where aspects/features/functionality associated with comfort map management described herein are distributed across one or more locations and/or accessible via the cloud.

FIG. 4 shows a block diagram of a temperature control system to which the present disclosure applies. The purpose of the system is to regulate the temperature in a conditioned space 425 to maintain occupant comfort. To accomplish this, a system includes effective temperature sequence generator 405. The effective temperature sequence generator 405 includes a comfort map/profile manager to facilitate the aspects of comfort map management/discussed in greater detail below. The effective temperature sequence generator 405 manages comfort events/comfort maps and uses the comfort maps to develop a time sequence of temperatures corresponding to the thermal equilibrium boundary, TEB, in an example system implementation. The TEB sequence is intended to represent one or more temperatures at which the occupants will consider comfortable at particular times of day. The TEB temperature sequence serves as one input to an execution temperature trajectory generator function 410 (the functionality of which may be distributed, in some implementations, e.g., via comfort map manager 534 and control temperature sequence generator 538, discussed below with reference to FIG. 5), forming the basis of a setpoint sequence $T_{sp}(n)$ (also referred to herein as an operating temperature time sequence, $T_{con}(n)$) which serves as the (possibly time varying) input setpoint of a temperature regulator 415. Temperature regulator functional block 415 compares an observed temperature sequence, $T_{obs}(n)$, created by the aggregation of signals from one or more sensors placed within the conditioned space 425 (the physical space for which the temperature is to be controlled) against the setpoint temperature $T_{sp}(n)$, and uses this comparison to generate control signals which, in turn, are supplied to HVAC equipment 420. Examples of HVAC equipment 420 are air conditioners, electric heat pumps, gas or oil forced air furnaces, and various hydronic heating systems. HVAC equipment 420 accepts these control signals and modifies the rate of heat flow $q_{dot}$ into or out of conditioned space 425 in response. In the context of the present invention, refrigeration applications may be viewed as a specialized form of air conditioning.

In some comfort control systems of the disclosure, effective temperature sequence generator 405, execution temperature trajectory generator 410 and temperature regulator 415 are combined with a temperature sensor, which estimates the conditioned space temperature $T_{obs}(n)$, in a single unit as thermostat 400. External inputs such as weather information, tariff and demand response request signals, which can be provided by the thermostat system itself (e.g., via shared resources/cloud computing, via a wifi network connection, etc.) and/or can be provided by utility companies, for example in an attempt to reduce peak power loading on a power generation and distribution system, can be used by execution temperature trajectory generator 410 to facilitate desired system responses, such as minimizing total energy cost or reducing peak electrical demand by careful planning of the setpoint temperature sequence $T_{sp}(n)$.

In one implementation, execution temperature trajectory generator 410 is a pass-through function, in which the setpoint sequence $T_{sp}(n)$ is identically sequence TEB derived from a comfort map. In other implementations, execution temperature trajectory generator 410 may use sequence TEB as the basis for control temperature sequence generation, but also taking into consideration the observed thermal characteristics of the conditioned space in order to create a setpoint sequence which better represents the comfort requirements of the occupants. For instance, the setpoint generator may observe the temperature response of the conditioned space via the observed temperature sequence $T_{obs}(n)$, along with other observations to determine an adaptive thermal model for the system along with other observed conditions, such as external weather information in the form of either observed for forecast weather.

Execution temperature trajectory generator 410 may monitor one or more variables responsive to the rate of heat moved in or out of conditioned space 425, $q_{dot}$, as a function of time. One example of such an observation is an estimate of the duty cycle of an air conditioner, heat pump or furnace. Another observed variable could be the input current or power, all signals responsive to the rate of flow of heat into or out of conditioned space 425. These observations can be used to create a mathematical model relating an expected observed temperature sequence $T_{obs}(n)$ to the observed conditions. From this, a so-called inverse model can be created, which can be used to determine a set-point sequence $T_{sp}(n)$ working within the physical and thermodynamic constraints of conditioned space 425 and HVAC equipment 420 having desirable features with respect to occupant comfort. Execution temperature trajectory generator 410 may choose to modify the setpoint sequence in response to a tariff schedule, in which the cost of energy varies over time, or may react to a demand-response event. A more sophisticated system may determine whether a conditioned space is occupied or intended to be occupied, making further adjustments to the setpoint sequence in response for the purpose of achieving some objective, usually reducing total energy consumption or cost. In some cases, the functions of effective temperature sequence generator 405, execution temperature trajectory generator 410 and temperature regulator 415 are mechanically bundled into a single physical device referred to as a thermostat 400. In other systems, the HVAC equipment/functions may be distributed in hardware as is often done in commercial buildings employing a building management system, such as SCHNEIDER ELECTRIC ANDOVER CONTINUUM building management system. In yet other systems, the functions may be distributed between dedicated local hardware and/or remote storage application sites/data centers, such as a communicating thermostat and remote "cloud" computing resources.

Referring to FIG. 5, a block diagram of one embodiment of the present disclosure is shown. In some embodiments, temperature conditioned space 510 is defined as a physical volume, such as a room, house, commercial building, etc. equipped with a heating and/or cooling system and a device to regulate the temperature within the space. Temperature control is achieved via a thermostatic control device 514 capable of controlling commonly available HVAC equipment 518 via HVAC control signals. The thermostatic control device 514 can accept a temperature setting from an external source, shown as the temperature sequence $T_{con}(n)$ (also referred to herein as "$T_{sp}(n)$") and can furnish measured temperature values, shown as the temperature sequence $T_{meas}(n)$ or $T_{obs}(n)$. HVAC equipment 518 can cause heat to flow into or out of the temperature conditioned space 510 at a (possibly time varying) rate, as shown as $q_{dot}$ in FIG. 5.

In some implementations, in operation, comfort map manager 534 accepts an appropriate initial comfort map (e.g., "CM(0)" 522) from profile library manager 526 and from it creates a sequence of comfort maps (e.g., "CM(k)" 535) in response to each comfort event received from the occupants as the episode unfolds in time with the index k ranging between 0 with the initial comfort map, and ending with K, where K is the total of number of comfort events initiated during the episode. In another implementation, comfort map manager 534 accepts an appropriate initial comfort map (e.g., "CM(0)" 522) from profile library manager 526 and updates/modifies it "K" times, where K is the total of number of comfort events initiated during the episode, and then stores it at the end of the episode. In some implementations, the updated comfort map is stored back into the appropriate profile within the profile library.

Figure 20A:
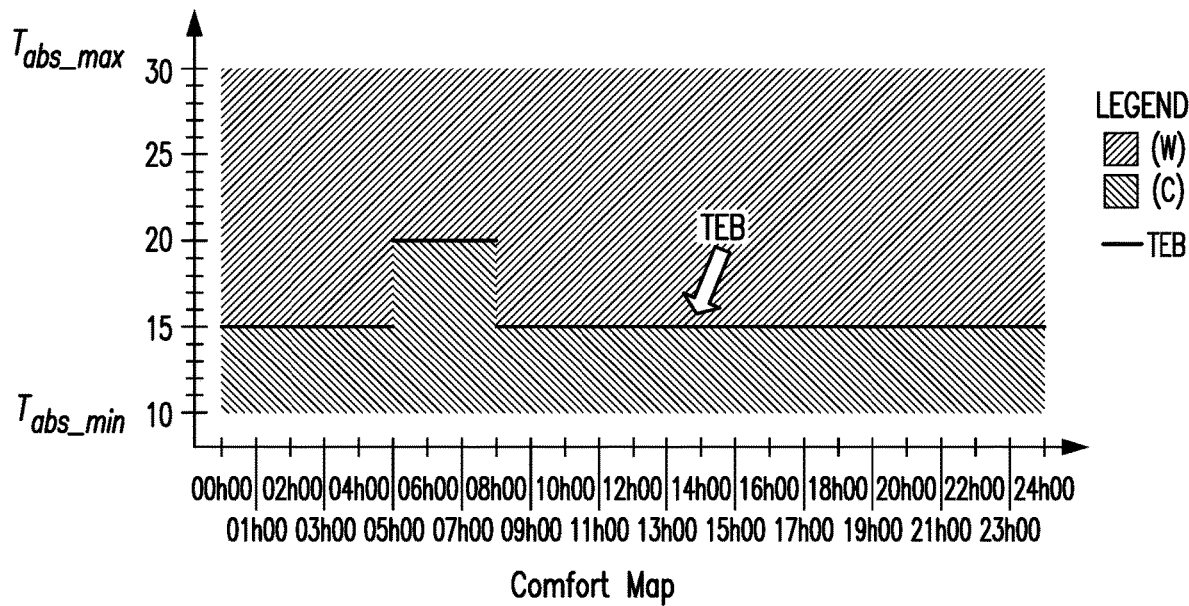
FIG. 20A is a chart (time versus temperature) showing an exemplary comfort map for an episode subsequent to the episode of FIG. 19A, according to some embodiments.

In some embodiments, an intelligent agent 530 of the present system learns/develops an operating temperature time sequence or execution temperature trajectory as $T_{con}(n)$ derived from a comfort map to promote occupant comfort. The occupants do not need to know or program temperatures or times. A comfort map (e.g., shown in FIGS. 8, 20A and 20B) stores information regarding the comfort of the occupants (e.g., in the form of a comfort map characteristic data and in some instances comfort event data) as a function of the time of day, treating occupant comfort as a multivariable map of time, temperature, and comfort characteristic data. Further details of the comfort map will be presented subsequently. Profile library manager 526 is provided to account for the possibility that patterns of occupancy and comfort may vary based on calendar and activity considerations. For instance, activities and occupancy patterns within a conditioned space can differ between weekdays and weekends. The purpose of the profile library manager 526 is to select and present the appropriate comfort map(s) (for example, "initial" comfort maps, designated CM(0) 522 or an existing comfort map associated with a profile) to an intelligent agent 530, which includes a comfort map manager 534 and a control temperature sequence generator 538, at the beginning of a day and to store and maintain comfort maps at the end of the day.

At the beginning of an episode (e.g., a day), the profile library manager 526 provides an initial comfort map CM(0) 522 (or existing comfort map) suitable for that episode to the comfort map manager 534. In some instances the provided comfort map may be an active comfort map that had been stored in the corresponding profile in a profile library at the end of a previous episode. The comfort map is subsequently used by control temperature sequence generator 538 to suggest a time sequence of temperatures by the intelligent agent 530 to be comfortable by the occupants. In some embodiments, control temperature sequence generator 538 can accept the most recent comfort map from comfort map manager 534, and from the most recent comfort map, create a sequence of control temperature values going forward in time.

The occupants residing in temperature conditioned space 510 are provided the ability, via occupant feedback device 542, to provide direct comfort event user feedback data as a comfort event to the intelligent agent 530 when conditions experienced within the conditioned space 510 are subjectively warm or cool to the occupants. In one implementation of the present disclosure, the occupant feedback device 542 is a pair of real or virtual pushbuttons provided within the temperature conditioned space 510 for the occupants to provide comfort event user feedback data. For example, one pushbutton can be labeled with a "PLUS" (+) or "up" (↑) indicia indicating a PLUS comfort event, wherein the conditions experienced by the one or more occupants of the temperature conditioned space 510 are subjectively cool relative to what would be considered comfortable. The other pushbutton can be labeled with a "MINUS" (−) or "down" (↓) indicia indicating a MINUS comfort event, wherein the conditions experienced by the one or more occupants of the temperature conditioned space 510 are subjectively warm relative to what would be considered comfortable. This comfort event user feedback data, generated during the course of a episode/day in the form of a sequence of comfort events shown as CE(k), is interpreted by intelligent agent 530 via comfort map manager 534, which modifies the comfort map currently in use to account for the occupant feedback in a manner to be discussed later. The newly modified comfort map for the present episode (day) is interpreted by control temperature sequence generator 538, to generate the resulting modified control temperature sequence $T_{con}(n)$ for the rest of the day until either 1) the day is complete or 2) another comfort event is initiated by the occupant(s) (or, in some embodiments, by the intelligent agent 530). At the end of the day in which some number (K) of comfort events have been issued by occupants, the profile library manager 526 stores the learned behavior in the form of the comfort map CM(K) 523, and the process repeats in a closed-loop feedback process.

According to some embodiments, the subjective comfort of occupants can be represented in a multivariable "map" of time, temperature and comfort characteristic data, referred to herein as the "comfort map," and the intelligent agent 530 can learn/develop the comfort maps optimized for user comfort from occupant comfort feedback data alone. Therefore, the occupant is only required to indicate, by using the occupant feedback device 542, when conditions within the temperature conditioned space 510 are no longer considered comfortable. Occupants are not required to enter any program schedule, temperature, time or other information. Using the learned comfort map, the intelligent agent 530 develops a proposed time sequence of temperatures, $T_{con}(n)$, representative of what the intelligent agent 530 determines/estimates would make an occupant comfortable.

As described above, the term "episode" is used herein to refer to an instantiation of a comfort map accessed from a given profile (e.g., a fixed subdivision of time over which a replicatable temperature profile can be established). In some implementations, a profile is a building block that may be used individually, or in the aggregate, to create a comfort map representative of an episode. In other implementations, a profile is where comfort map data and episode data is stored and maintained as a profile library. As an example, if the profile library manager 526 stores a profile named "weekday," meaning that this profile is used for episodes on Monday, Tuesday, Wednesday, Thursday and Friday, then no distinction is made by the system between the comfort maps instantiated for episodes on those particular days. The same map stored in the profile at the end of one episode is accessed and used at the beginning of the next episode. Accordingly, the learning from executed comfort events and the corresponding updates to the comfort maps for those episodes are used to maintain a dynamically updated profile and corresponding comfort map. Also, no distinction is made by the system for temperature requirements for comfort between Monday Tuesday Wednesday, Thursday and Friday. Monday and Tuesday are two separate episodes the profile "weekday" which share a comfort map, and the system can learn something from the episode on Monday that can be applied to Tuesday. The profile library may also have a second profile named "weekend," meaning that the weekend profile's comfort map is executed during episodes corresponding to Saturday and Sunday, and that no distinction is made between the temperature requirements for comfort between Saturday and Sunday. What is learned on Friday does not necessarily apply to Saturday because they are not the same profile/comfort map, but any comfort event learning that takes place on Saturday is retained for Sunday. In some instances, a profile may correspond with a heating HVAC state or with a cooling HVAC state.

If an occupant is exposed to a specific temperature at a specific time within temperature conditioned space 510 during the course of a day without knowing the actual temperature, he or she can usually readily and/or quickly conclude one of the following:

The present condition of the temperature conditioned space 510 is cool relative to what would be considered comfortable by the occupant.

The present condition of the temperature conditioned space 510 is warm relative to what would be considered comfortable by the occupant.

Occupants may be motivated to indicate either of these conditions by using the occupant feedback device 542 as described to initiate a comfort event, and the comfort control system will take the appropriate steps to improve the condition. A third possibility is that the present condition of the temperature conditioned space 510 is neither warm nor cool relative to what would be considered comfortable by the occupant. In this case, occupants will not be motivated to issue feedback. The intelligent agent 530 interprets this lack of feedback as tacit acceptance of the present condition and takes no action.

Comfort Map/Profile/Profile Library Creation

FIGS. 6-10 discuss aspects of establishing profile, comfort map, episode operational constraints, as well as using the operational constraints to build an actionable comfort map with time, temperature and comfort characteristic data. FIGS. 11-20B discuss a variety of comfort map/occupant/system interaction features and functionality.

Specifically, FIGS. 6-10 discuss several ways that comfort map data may be generated and incorporated with a profile and accordingly stored in a profile library. A comfort map can be generated and/or initialized (i.e., an initial comfort map can be created by the system) in a number of ways, including using (1) historical temperature/occupant data; (2) an initial temperature setpoint provided by a commissioning agent; (3) an initial table of temperatures provided by the commissioning agent; (4) a rule based on a minimum temperature and/or a maximum temperature of a comfort range; (5) control temperature data retrieved from a repository (e.g., a profile library or a comfort map library), and/or the like, or using an arbitrary initialization scheme, to define the plurality of sets (e.g., {C}, {W}) as described herein. For example, Table 1 (e.g., an initial table of temperatures provided by the commissioning agent) can be represented as (i.e., translated into) a comfort map, shown in FIG. 9.

One method of generating a comfort map framework as an episode state space is based on a table of time segments and temperatures to maintain across each segment. For example, a user may specify a initial control temperature sequence for an occupied space as a series of segments representing the time-temperature setpoint trajectory as a sequence of intervals, in time, of constant temperature (as in Table 1 below). In one example, a table comprises a small number of segments represented constant tas describing the TEB of a initial comfort map which can be used to derive an execution temperature trajectory across an episode state space. Each segment is defined by a starting time within the interval of discourse and a constant temperature over the segment. Table 1 shows five such segments.

TABLE 1

| Segment | Start Time | Temperature C. ° |
|---------|------------|------------------|
| S0 | 00h00 | 20.0 |
| S1 | 05h30 | 22.5 |
| S2 | 10h00 | 17.5 |
| S3 | 14h30 | 22.5 |
| S4 | 22h00 | 20 |

This table may be used to draw an execution temperature trajectory across a given episode state space. A TEB may be mapped to the execution temperature trajectory. In generating the comfort map, "Warm" comfort characteristic variable settings established for all elements or points above the TEB, and "Cool" comfort characteristic variables settings established for all elements or points below the TEB. Once time, temperature and comfort characteristics are generated for the comfort map, the comfort map is assigned to a profile that also includes use data (e.g., "weekday" or Monday, Tuesday, Wednesday, etc. . . . ) that may be established by the user, a commissioning technician and/or a system administrator or pushed post-commissioning as a system update.

Figure 6:
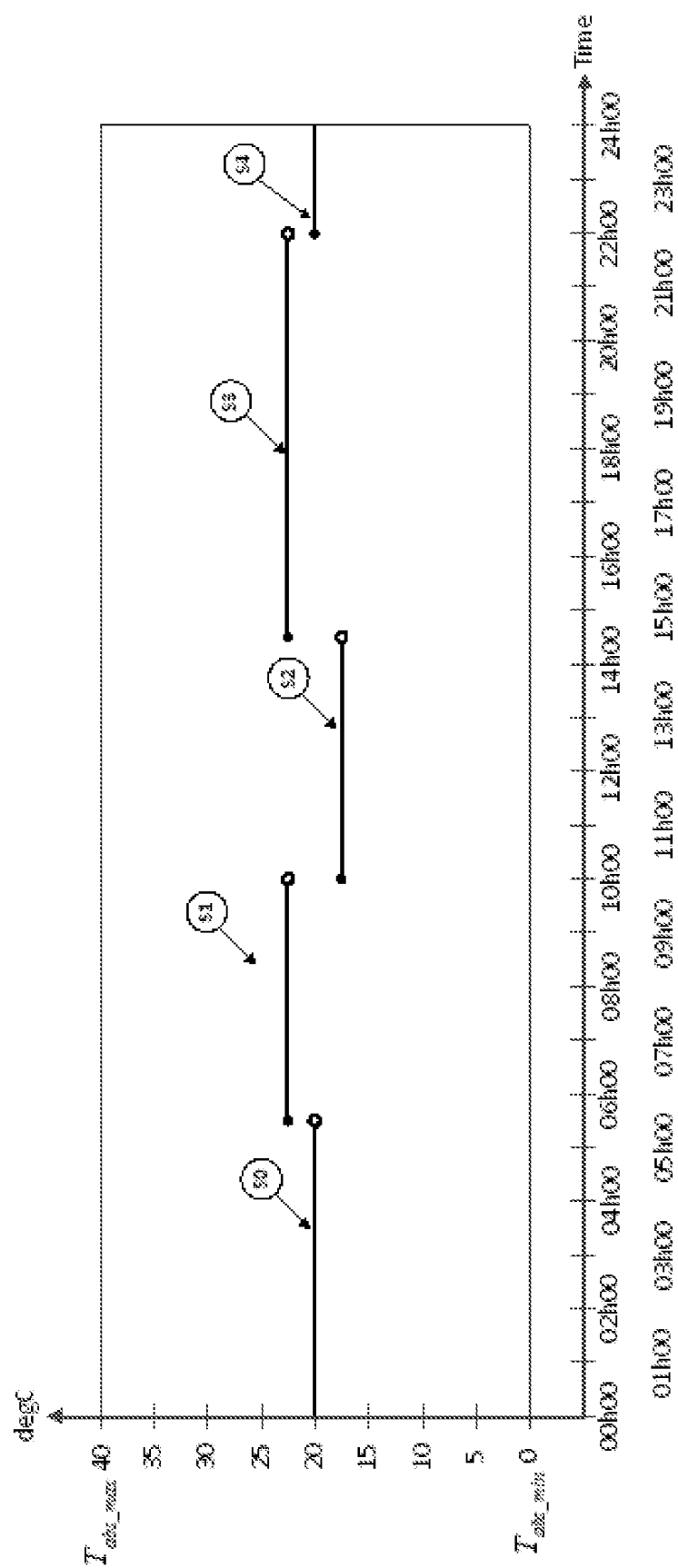
FIG. 6 is a chart (time versus temperature) of an initialization temperature sequence, according to some embodiments.

In some implementations, the user may get to choose from one or more graphical time/temperature sequences that best approximate the occupants' typical system use. Alternately, the user may be presented with a smartphone/tablet application that allows the user, someone who commissions the system or a remote system administrator to draw their own approximation of system use. FIG. 6 illustrates the resulting execution temperature trajectory for a given episode state space based on a graphical user input method or using Table 1 as an input. The temperature segments (discussed above, with reference to Table 311 of FIG. 3), illustrate how the comfort control system, in some embodiments, interprets a table of temperature values (rather than an initial Comfort Map) to create a initialization temperature sequence reflecting the desired initial temperature of the space as a function of time, according to some embodiments. For illustrative purposes, Table 311 of FIG. 3 comprises the segments S0, S1, S2, S3 and S4 which correspond to the graphical segments illustrated in FIG. 6. Accordingly, the time, temperature and comfort characteristics are established for the episode state space to generate comfort map data. Similarly, in some embodiments this comfort map data may be incorporated into a profile that includes episode 'use' data (e.g. Monday, Tuesday, Wednesday etc. . . . ).

The system accesses the profile and corresponding comfort map for instantiation as an episode starting at midnight of the present day, or 00h00 hours in FIG. 6). In this example, it is assumed that the temperature set-point is user selected input or pre-determined from some historical information, in this case 20° C. Segment S0 in FIG. 6 represents the initial temperature set-point at the beginning of the episode. In operation, the comfort control system utilizes this set-point (S0) until about 05h45 (5:45 AM), which is the defined start time of segment 51, per FIG. 6. At 05h45, the comfort control system uses the temperature defined for segment S1, 22.5° C. This setpoint is maintained until 10 h00 (10:00 AM), at which time programmed segment S2 begins. From 10 h00 until the beginning of segment S3, the setpoint temperature is that defined for segment S2, 17.5° C. Segment S3 begins at 14h30 (2:30 PM), at which time the comfort control system setpoint becomes 22.5° C., in time to accommodate the occupant comfort needs while they are home for the evening. As discussed above, this setpoint temperature is maintained until the beginning of segment S4 at 22h00 (10:00 PM), at which time the sleep temperature of 20° C. begins. As discussed herein, at any time during execution of the episode, a user may initiate a comfort event to provide direct comfort characteristic feedback data to modify the active comfort map, adjust the execution temperature trajectory and facilitate an improved user comfort experience for this and future episodes.

In one implementation, the commissioning agent (person who commissions the system) specifies a minimum and maximum comfort temperature for the system for each mode (heating or cooling). This defines a range of temperatures within the operating range of the equipment, specified by $T_{abs\_min}$ and $T_{abs\_max}$, but which further reduces the operating range of the system to levels based on other considerations, such as pets and plumbing. Define commissioned comfort temperature limits for the heating mode by $T_{HCmax}$ and $T_{HCmin}$, and $T_{CCmax}$ and $T_{CCmin}$ for the cooling mode. In one implementation, the average of $T_{HCmax}$ and $T_{HCmin}$ or $T_{CCmax}$ and $T_{CCmin}$ are used as the initialization temperature. Accordingly, the defined comfort range, may be used as a foundation for building a corresponding comfort map/profile as discussed above with regard to FIG. 3 or 6.

As discussed above, a profile library is a collection of profiles that include comfort map data, as well as data used to build and manage comfort maps, such as episode operational parameters. An episode state space is the operational framework or definition of the operational constraints for instantiating and executing a comfort map. One assumption made in embodiments of the method described herein is that humans operate on nominal circadian rhythms. They typically rise from sleep at about the same time, consume meals according to a routine, and certainly work, go to school, etc. on a recurring routine. Episodes (or "episodic sequences") need not describe "day to day" conditions. For instance, if particular patterns emerge in the behavior of the occupants on Tuesdays, one can describe "Tuesdays" as an episodic sequence. An episodic sequence need not have a period of 24 hours. A weekly sequence can emerge as well, where Monday follows Sunday, Tuesday follows Monday, etc. and it can be expected that the patterns for each week tend to repeat. In some embodiments, an episode can comprise multiples, combinations and/or subdivisions of a 24-hour day. Profile data can include the type of day (e.g., day of week, weekday, weekend, holiday, work day, exercise day, vacation day, etc.). For example, in some embodiments, a "Friday" episode can be different for an episode used to characterize "Monday through Thursday," or a "Saturday" episode may differ from a "Sunday" episode.

Episode State Space—When describing the operation of a comfort control system, an "episode state space" (e.g., a time-temperature space) is the permissible region of operation of the comfort control system over an episode in both time and temperature. FIG. 7A is a graphical depiction of the operating area of a typical comfort map over an exemplary episode (i.e., an "episode state space"), indicating the time and temperature range over which the episode is defined, according to some embodiments. FIG. 7B shows the episode state space of FIG. 7A, discretized or partitioned (in both time and temperature) into a plurality of rectangular elements. The time spanned by the episode, shown on the horizontal axis, is from midnight of a day inclusive up to but not including midnight of the following day (24 hours). Time is represented in the form xxhyy, where xx denotes the hour and yy denotes the minute. Topologically, one refers to this as a left-closed interval and is written [00h00, 24h00).

"Left-closed" means the interval includes the defined start time of the present episode, say midnight, and includes everything up to, but not including the start time of the next episode. (Note that in other embodiments, the time spanned by an episode can be right-closed. Also, in some embodiments, adjacent episodes can overlap at least partially.) Episode time in FIGS. 7A and 7B begins at 00h00 and ends at 24h00. The temperature spanned by the episode, shown along the vertical axis, ranging from a minimum temperature, $T_{abs\_min}$ at the lower left to a maximum temperature, $T_{abs\_max}$ at the upper left. As described previously, these two limits are chosen based on practical considerations of implementation, such as the expected operating range of the comfort control system, the working operating range of the thermostatic control device 14, and other practical considerations. In FIG. 7A, exemplary values of $T_{abs\_min}$ and $T_{abs\_max}$ are 0° C. and 40° C. respectively. Clearly other ranges are possible, as are other units of temperature. In the discussion that follows, time 00h00 represents midnight of the present day, whereas 24h00 represents midnight of the next day (which is not included in the episode state space in a left-closed interval representation). It is recognized that an episode need not begin and end at midnight. In these instances the time shown represents an offset from the actual start time. While the present embodiment defines an episode as a 24 hour sequence, it is recognized that other periods may be used, such as "morning," "afternoon" and "evening."

In what follows, the symbol T is a variable responsive to dry bulb temperature. In the specific examples that follow, dry bulb temperature is used and the word "temperature" refers to this, but it should be clear that any variable responsive to dry bulb temperature could be employed, including wet bulb temperature and other possible variants. The representation of temperature can be dependent upon the "mode" of the comfort control system (e.g., heating mode or cooling mode). In some embodiments, and for reasons which will become apparent, in the heating mode the episode state space range of T comprises a left-closed interval in temperature defined by:

$$T_{abs\_min} \leq T < T_{abs\_max} \quad (1.1)$$

where $T_{abs\_min}$ and $T_{abs\_max}$ are the minimum and maximum temperatures of interest to the system. In the cooling mode, the episode space temperature range comprises a right-closed interval defined by:

$$T_{abs\_min} < T \leq T_{abs\_max} \quad (1.2)$$

In some embodiments, the numeric values of $T_{abs\_min}$ and $T_{abs\_max}$ are chosen based on practical considerations, such as the ability for electronic hardware to accurately measure temperatures over a given range, the practical operating range of a heating or cooling system, etc. In the episode state space of FIG. 7, $T_{abs\_min}$ and $T_{abs\_max}$ are shown as 0 C.° and 40 C.° respectively, and these values will be utilized in all examples presented. In other embodiments, the values of $T_{abs\_min}$ and $T_{abs\_max}$ can be chosen to coincide with the functional limits of the physical thermostat or HVAC system operational constraints employed to regulate temperature in the temperature conditioned space. These limits can be hard-coded, dynamically updatable or selected during commissioning.

In the present disclosure, the episode state space is "discretized," or subdivided, in both time and temperature, into rectangular "elements" or "quanta" (e.g., having a "width" in time, and a "height" in temperature). In some embodiments, the element also includes a comfort map comfort characteristic variable or set assignment. In an implementation, an episode space comprises 24 hours, and the 24 hours (1440 minutes) of the episode space are divided into N discrete time quanta of length $\Delta t_{res}$. In one implementation, $\Delta t_{res}$ is 10 minutes, which results in the episode space divided into N=144 discrete time "quanta," referred to herein by $t_q(n)$ where n is the index, in the range $0 \leq n \leq (N-1)$. One can reference the specific beginning time of the time quantum of interest in minutes, since the reference time 00h00 using $$t_n = n\Delta t_{res}, n=0,1,\ldots,N-1 \quad (1.3)$$

Using this definition, in some implementations, a concise definition of the nth time quantum, tq(n) is the left-closed interval defined by $$t_q(n) = \{t \in \mathbb{R} \mid t_n \leq t < t_{n+1}\} \quad (1.4)$$

where $\mathbb{R}$ represents the commonly understood set of real numbers. As a shorthand notation, the index "n" may be used to indicate the time quantum and it will be understood that when time quantum "n" is used in this manner, it refers to equation (1.4).

In temperature, the episode state space quantization or subdivision can be dictated for comfort preference classifier purposes by the "resolution" of the actual thermostat that controls the temperature conditioned space. This resolution is referred to herein as $\Delta T_{res}$ (or the temperature quantization parameter). For convenience, $\Delta_{Res}$, $T_{abs\_min}$ and $T_{abs\_max}$ can be chosen such that the length of the closed interval [$T_{abs\_min}$, $T_{abs\_max}$] is an integer multiple of $\Delta T_{res}$. As illustrated 5 C.° In one implementation, the temperature set-point resolution of the thermostat is 0.5 C.°, which allows that the temperature range of the episode space, [0 C.°, 40 C.°] can be represented by M=80 temperature quanta. In what follows, the index "m" will be used to represent this quantization, and the $m_{th}$ time quantum will be written as either $T_{H(m)}$, or $T_{C(m)}$, dependent upon the mode (H implies heating while C implies cooling).

In some embodiments, in the heating mode, temperature quanta are represented by left closed intervals in and heating temperature quantum $T_{H(m)}$ is given by:

$$T_{H(m)} = \{T \in \mathbb{R} \mid T_m \leq T < T_{m+1}\}, m=0,\ldots,M-1 \quad (1.5)$$

where $T_m$ is defined for either mode, using the index m as the quantum index, m=0, 1, . . . M−1 by $$T_m = T_{abs\_min} + m\Delta T_{res} \quad (1.6)$$

In the cooling mode, temperature quanta are represented by right-closed intervals, and cooling temperature quantum $T_{c(m)}$ is given by $$T_{c(m)} = \{T \in \mathbb{R} \mid T_m < T \leq T_{m+1}\}, m=0,\ldots,M-1 \quad (1.7)$$

As can be seen via the difference in interval definition between equations (1.5) and (1.7) above, in some implementations, a left-closed interval can be used when the system is in heating mode, and a right-closed interval can be used in cooling mode, resulting in the thermal equilibrium boundary being disposed in the set {W} when in heating mode (i.e., a rule to "stay out of {C} when heating") and in {C} when in cooling mode (i.e., a rule to "stay out of {W} when cooling").

Again, one can refer to the quantum using the index "m", if the mode is understood, and doing so implies the temperature quantum defined by (1.5) or (1.7) as appropriate. Using this quantization in time and temperature allows a composition of the episode state space into N×M rectangular "elements" as first noted above, referred to individually as $E_H(n, m)$ and $E_C(n, m)$, dependent upon the mode of operation of the system. These elements are defined by the regions:

$$E_{H(n,m)} = \{(t,T) \in \mathbb{R}^2 | t_n \leq t < t_{n+1}, T_m \leq T < T_{m+1}\} \quad (1.8)$$

and $$E_{C(n,m)} = \{(t,T) \in \mathbb{R}^2 | t_n \leq t < t_{n+1}, T_m < T \leq T_{m+1}\} \quad (1.9)$$

For n=0, 1, ... N−1 and m=0, 1, ... M−1, where $\mathbb{R}^2$ denotes the set of ordered pairs of real numbers.

If one is restricted to the temperatures in the set {Tm} as defined by equation (1.6) above, then by the definition of the elements dependent upon the operational "mode" (equation (1.8) for the heating mode and equation (1.9) for the cooling mode), it is seen that the sequence TEB (n) in the heating mode lies entirely in the element set {W}, whereas TEB (n) in the cooling mode lies entirely in the element set {C}. In another embodiment sequence TEB (n) in the heating mode lies entirely in the set {W}, whereas TEB (n) in the cooling mode lies entirely in the set element {C} based on mapping the TEB to the comfort characteristic associated with an element.

Prior to commissioning, the initial memberships and/or the comfort characteristic of the elements or points comprising the comfort map may be unknown. One way to define an initial comfort map is to specify an initial sequence TEB(n) and an initial comfort map can be derived based on the initial input. There are many ways to accomplish specify an initial sequence TEB(n). In one implementation, the commissioning person (individual who commissions the system) may specify a single initial temperature to the system directly to be used in creating a single valued initial TEB sequence (see, e.g., FIG. 8). The initial temperature must lie within the comfort range of the system for the mode as described above. In another implementation, the TEB sequence may be derived by the system from the minimum and maximum comfort range temperatures for the mode by using a rule. In one example of the rule implementation, the average of the minimum and maximum comfort range temperatures is used as the initial temperature and to develop a TEB sequence/comfort map.

Figure 9:
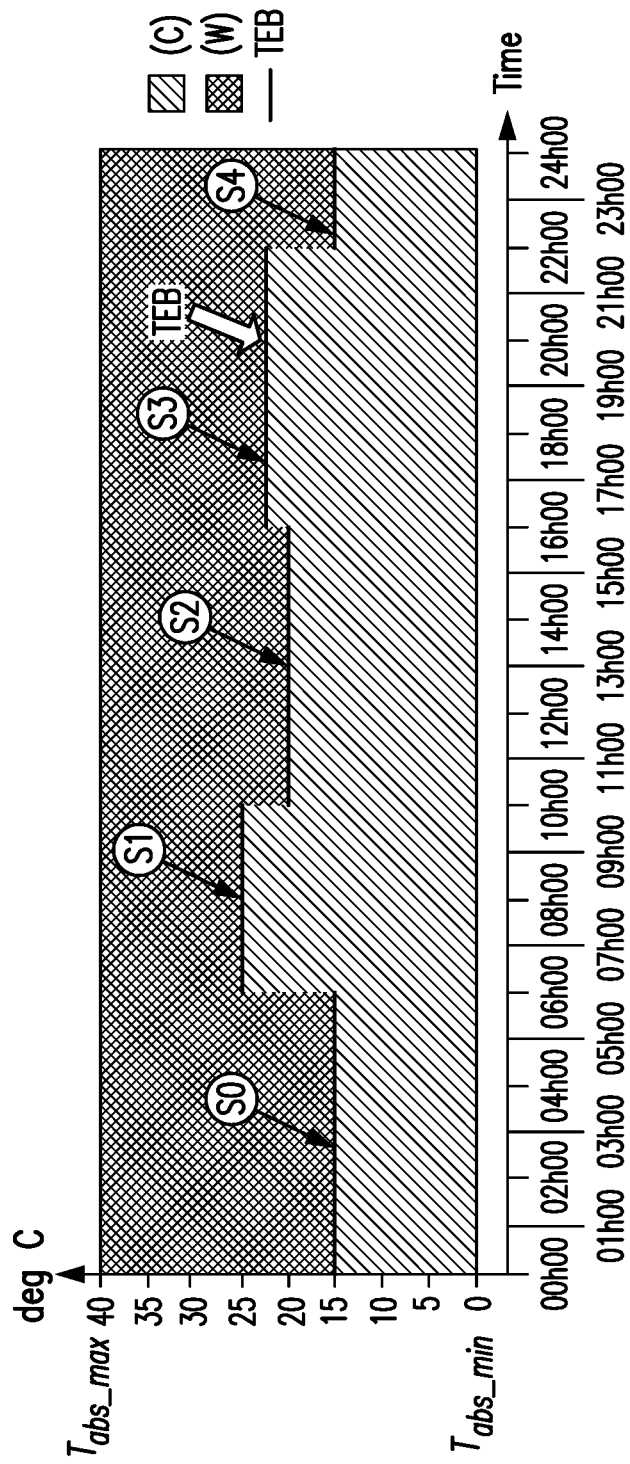
FIG. 9 is a comfort map (in time versus temperature) derived from a table of temperature setpoints, according to some embodiments.

The initial TEB sequence need not be a single temperature. For instance, a commissioning mechanism where the commissioning person is asked to choose the set of temperature values (see, e.g., Table 311 of FIG. 3, Table 1 above, or selects a graphic such as one illustrated in FIG. 6) that most closely describes the occupancy pattern for the user which could then serve as the initial TEB (for example, as shown in FIG. 9). In one implementation, the commissioning person can select one of list of pre-programmed TEB sequences similar to a traditional thermostat schedule, or may define a custom program.

Figure 10:
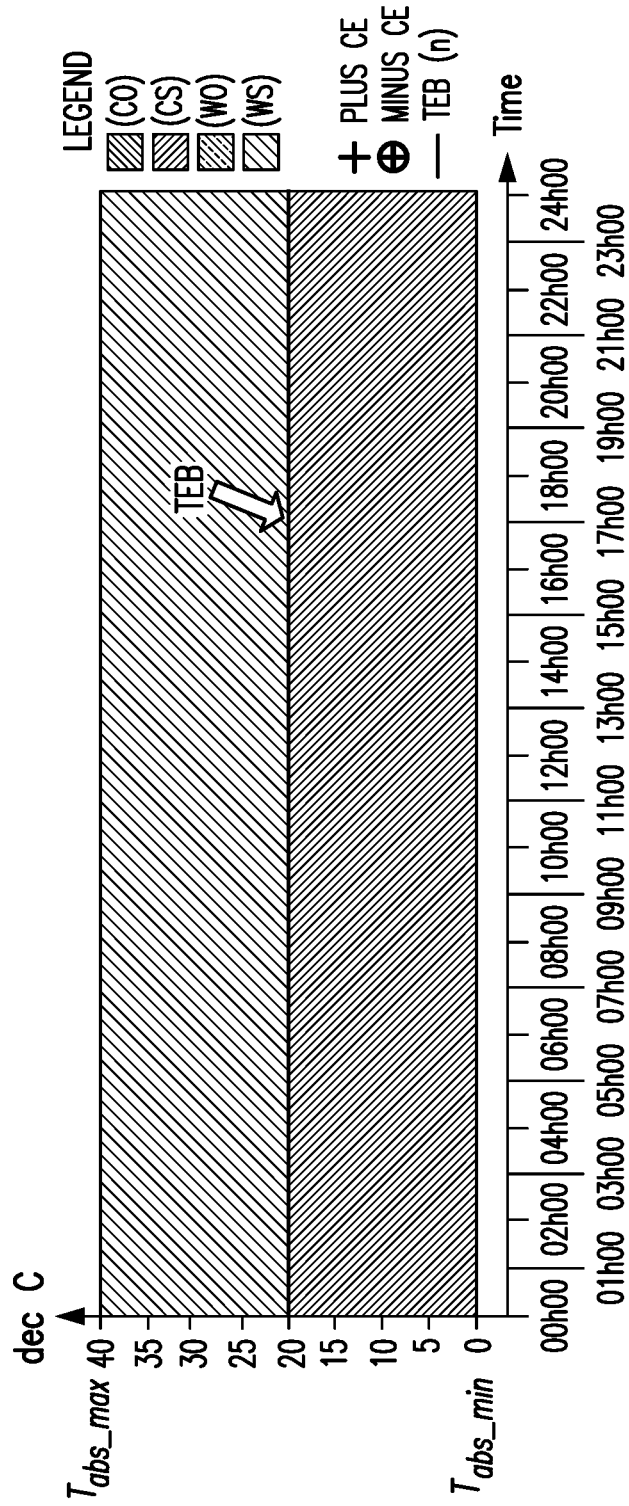
FIG. 10 is a chart (time versus temperature) of an initialized comfort map, according to some embodiments.

Once the initial TEB sequence is defined, the comfort map for a profile can be initialized by the system such that the boundary of the sets {C} and {W} corresponds to the TEB sequence. FIG. 10 shows a comfort map initialized to an initial temperature setpoint of 20 C.° using this method. As can be seen in FIG. 10, the area below the TEB has been initialized with a comfort characteristic as cool and associated by the system to the set {C}, while the area above the TEB sequence is initialized with a comfort characteristic as warm to the set {W}. Each element of the comfort map can be treated as an object having defined variable attributes. Examples of attributes associated with comfort map elements or datapoints include:

The time quantum represented by the element;
The temperature quantum represented by the element;
The comfort characteristic variable value for the element;
The present set membership of the element, e.g. (a) {W} for a warm element or {C} for a cool element;
The type of change (transient or persistent) that led to the element or datapoint attributes;
Whether the element or datapoint is user-defined or system-defined;
The previous state of the element (all the categorical elements described above) so we can recover the previous state if the change is transient; and/or
The length of time or number of episodes over which the present element has been in the present state.

It is to be understood that, depending on the implementation, other element attributes are possible.

Occupant Interaction with System—As described above, once the occupants have actually experienced a time-temperature pair, they can (consciously or unconsciously) make one of three judgments regarding the state:

1. It is cold enough to trigger an action by the occupants.
2. It is warm enough to trigger an action by the occupants.
3. It is neither warm enough nor cold enough to trigger an action.

This is true in both the heating and cooling modes. As described above, in one embodiment of the present disclosure, two real or virtual pushbuttons are provided which the occupants can press to signify to the system the occupant feedback and the type of action to be taken by the system to correct. One pushbutton, labeled "+", is interpreted as an indication that the temperature experienced is too cool and the occupants would prefer a warmer temperature at the time of the action. The other pushbutton, labeled "−", is interpreted as an indication that the temperature experienced is too warm and the occupants would prefer a cooler temperature at the time of the action. More generally, one refers to these two actions as a PLUS comfort event corresponding to pressing the "+" pushbutton and a MINUS comfort event corresponding to pressing the "−" pushbutton. In what follows, the description will refer to PLUS comfort events and MINUS comfort events to allow that there may be other methods by which the occupants can express these preferences.

The comfort map concept is an effective way for an intelligent agent or an intelligent system to receive direct user comfort feedback data, process the data and act upon the data to estimate the intent of the occupants when a comfort event is initiated. In some embodiments, a comfort event includes the following information, sufficient to enable the system to interpret the event and learn from it:

1. The "type" of comfort event (e.g., PLUS or MINUS, as described above) as comfort characteric feedback data.
2. The time the event was initiated. In this document, this time will be referred to as $t_{ce}$, independent of the type of event.
3. The observed space temperature at the time the event was declared. In this document, this temperature will be referred to as $T_{ce}$, independent of the type of event.

It is assumed from a PLUS comfort event that at the time and temperature pair $(t_{ce}, T_{ce})$ as a comfort event reference point at which the event was declared at least one occupant would prefer that a region around this time-temperature be avoided. Certainly, the specific time-temperature pair $(t_{ce}, T_{ce})$ is considered too cold by the occupants, but the following can also be reasonably assumed:

1. Any temperature less than $T_{ce}$ at or around the time of the event may also be considered too cold.
2. If $T_{ce}$ is considered too cold at the time of event initiation $t_{ce}$, it and temperatures slightly greater are likely too cold also for some time in the immediate past and into the immediate future. In some embodiments, $\Delta T_p$ is a constant value with a typical value of about 1 C.°.

3. There was likely some time elapsed between the time the occupant actually began to notice that he/she felt too cold and the time at which the action was actually triggered. For instance, it may be that at the time the occupant realized the temperature was too cold, the occupant was also doing something that didn't warrant an immediate response. The time the event was actually initiated was one of convenience for the occupant. This is reflected in the parameter $\Delta t_p^-$ shown in FIG. 11. In some embodiments, $\Delta t_p^-$ is a constant value to estimate the intent of the occupant in generating the PLUS comfort event, with a typical value on the order of 0 to 20 minutes.

4. In the absence of action by the system, it is likely that this perception of feeling too cool will continue some time into the future. This is reflected in the parameter $\Delta t_p^+$ shown in FIG. 12. In some embodiments, $\Delta t_p^+$ is a constant value to estimate the intent of the occupant in generating the PLUS comfort event, with a typical value on the order of 60 to 120 minutes.

Expressed on a comfort map, this implies that a region or window in the comfort map "around" the time and temperature of event initiation and meeting the general assumptions above should be assigned to the element set {C}, independent of the membership of that region prior to the comfort event.

Subsetting—In some embodiments, subsets of the sets of the comfort map can be defined, for example to facilitate energy savings. In one implementation of a learning system, the set {C} is expressed in terms of the set-union of two mutually exclusive subsets:

1. A subset {CS}, which indicates to the system that a given element in the comfort map was assigned to the element set {C} by the intelligent agent (system) itself.
2. A subset {CO}, which indicates to the system that a given element in the comfort map was assigned to the element set {C} by virtue of occupant interaction—a concept which will be described in detail subsequently.

Similarly, the element set {W} described above may be expressed as the set-union of two mutually exclusive subsets:

1. A subset {WS}, which indicates to the system that a given element in the comfort map was assigned to the element set {W} by the intelligent agent (system) itself.
2. A subset {WO}, which indicates to the system that a given element in the comfort map was assigned to the element set {W} by virtue of occupant interaction.

In addition to, or as an alternative to, subsetting based on whether set assignment was occupant or system driven, subsetting can also be based on whether a given set assignment is revertible or non-revertible (i.e., a permanent change of a temporary change). Whether or not a comfort map will be modified in response to a comfort event can depend, in some embodiments, on whether the comfort event "conflicts" with the existing comfort map. For example, a "conflict" can relate to whether set assignment was occupant or system driven and/or whether a given set assignment is classified by the system as revertible or non-revertible, The subsetting defined above is not intended to construe a limitation to the method of representing occupant comfort by a comfort map, and as the system continues to evolve, further subdivision of the comfort space beyond that described here is fully expected.

In one implementation, a PLUS comfort event re-assigns comfort characteristic variable settings for a rectangular "window" of elements (i.e., a comfort event window) of the comfort map and may associate the elements with a subset {CO} or the set {C} of states in the episode state space considered "cool" indicating that this region has been declared "cool" by an occupant.

FIG. 11 shows graphically an exemplary definition of the window of time-temperature assigned to a set {C} or a subset {CO} of the set {C} when a PLUS comfort event is declared at $(t_{ce}, T_{ce})$, which defines the comfort event reference point. In the time dimension of the episode space, the rectangular window begins at the declared time of the comfort event, $t_{ce}$, less an amount $\Delta t_p^-$ and ends at a time $\Delta t_p^+$ beyond $t_{ce}$. The beginning the window $\Delta t_p^-$ is set prior to the actual time of initiation of the comfort event because it is likely that the occupants were beginning to experience discomfort prior to acting upon it. The end of the window is set to a time $\Delta t_p^+$ beyond the time at which the event was initiated because the occupants were motivated to initiate the PLUS comfort event, the system should maintain comfort at whatever new level is required for a minimum period. In one implementation of the system (the one described as examples herein), $\Delta t_p^+$ is chosen to be a constant 120 minutes and $\Delta t_p^-$ is chosen to be a constant 20 minutes. In another implementation of the system (the one described as examples herein), $\Delta t_p^+$ is chosen to be a constant 60 minutes and $\Delta t_p^-$ is chosen to be a constant zero minutes. Selecting constant values of $\Delta t_p^+$ and $\Delta t_p^-$ should not be construed as a limitation on the system, however, and it is reasonable to expect that both $\Delta t_p^+$ and $\Delta t_p^-$ could be dynamically adapted as appropriate. In some embodiments, a comfort event window may extend in only one direction in time (e.g., $\Delta t_p^-=0$).

In some implementations, the PLUS comfort event window comprises all temperatures from $T_{abs\_min}$ (or any other predetermined lower limit value) to a temperature $T_{ce}$ $\Delta T_p$, where $\Delta T_p$ is an additive offset to that temperature to reflect the assumption above that if the occupant felt that the temperature at which the comfort event was initiated, $T_{ce}$, is too cold, then it can be assumed that the discomfort expressed by the PLUS comfort event also extends to a small range of temperatures greater than $T_{ce}$, represented by $\Delta T_p$. A value of 1 C.° is typical for $\Delta T_p$. Although a constant value of $\Delta T_p$ is used in the present discussion, it is recognized that values of $\Delta T_p$ which are variable, dependent upon conditions of the system, occupants and other considerations at the time of initiation of the event may be used.

A PLUS comfort event rectangular window can be completely specified by parameters $t_{ce}, \Delta t_p^-, \Delta t_p^+, T_{ce}, \Delta T_p$. A concise definition of a PLUS comfort event window in the heating mode, initiated at $(t_{ce}, T_{ce})$ is the set $PCE_H(t_{ce}, T_{ce})$ defined in temperature and time by:

$$PCE_H(t_{ce}, T_{ce}) = \{(t,T) \in \mathbb{R}^2 | (t_{ce}-\Delta t_p^-) \leq t < (t_{ce}+\Delta t_p^+), T_{abs\_min} < T \leq (T_{ce}+\Delta T_p)\} \quad (1.11)$$

The equivalent PLUS comfort event window in the cooling mode, $PCE_C(t_{ce}, \Delta T_p)$ defined in temperature and time by:

$$PCE_C(t_{ce}, T_{ce}) = \{(t,T) \in \mathbb{R}^2 | (t_{ce}-\Delta t_p^-) \leq t < (t_{ce}+\Delta t_p^+), T_{abs\_min} < T \leq (T_{ce}+\Delta T_p)\} \quad (1.12)$$

In both cases, the comfort characteristic of all points/elements in the comfort map defined by the comfort event window are assigned by system to the set {CO}.

In a similar manner, one can define a MINUS comfort event rectangular window of time-temperature pairs to be assigned to a set {W} or to a subset {WO} of the set {W} in the comfort map in response to a MINUS comfort event. FIG. 12 shows an exemplary MINUS comfort event window generated in response to a MINUS comfort event at time-temperature pair ($t_{ce}$, $T_{ce}$) as the comfort event reference point.

It is assumed from a MINUS comfort event that at the time and temperature pair ($t_{ee}$, $T_{ce}$) at which the event was declared at least one occupant was warm and would prefer that a region around this time-temperature be avoided. Certainly the specific time-temperature pair ($t_{ee}$, $T_{ce}$) is considered too warm by the occupants, but the following can also be reasonably assumed:

1. Any temperature greater than $T_{ce}$ at or around the time of the event may also be considered too warm.
2. If $T_{ce}$ is considered too warm at the time of event initiation $t_{ce}$, it and temperatures slightly less than $T_{ce}$ are likely too warm also. This is reflected by the parameter $\Delta T_m$ shown in FIG. 12. In some embodiments, $\Delta T_m$ is a constant value with a typical value of about 1 C.°
3. There was likely some time elapsed between the time the occupant actually began to notice that he/she felt too warm and the time at which the action was actually triggered. For instance, it may be that at the time the occupant realized the temperature was too warm, the occupant was also doing something that didn't warrant an immediate response. The time the event was actually initiated was one of convenience for the occupant. This is reflected in the parameter $\Delta t_m^-$ shown in FIG. 12. In some embodiments, $\Delta t_m^-$ is a constant value to estimate the intent of the occupant in generating the MINUS comfort event, with a typical value on the order of 0 to 20 minutes.
4. In the absence of action by the system, it is likely that this perception of feeling too warm will continue some time into the future. This is reflected in the parameter $\Delta t_m^+$ shown in FIG. 12. In some embodiments, $\Delta t_m^+$ is a constant value, to estimate the intent of the occupant in generating the MINUS comfort event, with a typical value on the order of 60 to 120 minutes.

While the window parameters have been described as predetermined, constant values, this should not be construed as a limitation to the present invention and it is to be understood that these values could be adapted and modified using a learning algorithm or through analytics.

Referring to FIG. 12, the MINUS comfort event window extends in time from a time $\Delta t_m^-$ prior to the time of the comfort event, $t_{ce}$ to a time $\Delta t_m^+$ after the time of the comfort event. In temperature, the window extends from a minimum temperature $\Delta T_m$, less than the temperature of the comfort event temperature, $T_{ce}$ to the maximum allowable control temperature $T_{abs\_max}$. Similar to the PLUS comfort event window above, the window is completely defined by the parameters $t_{ce}$, $\Delta t_m^-$, $\Delta t_m^+$, $T_{ce}$, $\Delta T_m$. As a shorthand notation, a MINUS comfort event in the heating mode, initiated at ($t_{ce}$, $T_{ce}$) is denoted by $MCE_H(t_{ce}, T_{ce})$, and a concise definition of the MINUS comfort event window is $$MCE_H(t_{ce},T_{ce})=\{(t,T)\in \mathbb{R}^2|(t_{ce}-\Delta t_m^-)\leq t<(t_{ce}+\Delta t_m^+), (T_{ce}-\Delta T_m)\leq T<T_{abs\_max}\} \quad (1.13)$$

An analogous definition for a MINUS comfort event in the heating mode, initiated at ($t_{ce}$, $T_{ce}$) is denoted by $MCE_c(t_{ce}, T_{ce})$, and a concise definition of the MINUS comfort event window is $$MCE_C(t_{ce},T_{ce})=\{(t,T)\in \mathbb{R}^2|(t_{ce}+\Delta t_m^-)\leq t<(t_{ce}+\Delta t_m^+), (T_{ce}-\Delta T_m)<T\leq T_{abs\_max}\} \quad (1.14)$$

In both cases, the comfort characteristic variable settings of points/elements in the "window" defined in the comfort map are assigned by the system to the subset {WO} of the set {W} in response.

With the comfort map defined as a quantized episode space, one can define comfort event windows in terms of the indices "n" and "m" defined above. Let the time and temperature of the comfort event be given by $$t_{ce}=n_{ce}\Delta t_{res} \quad (1.15)$$

and $$T_{ce}=T_{abs\_min}+m_{ce}\Delta T_{res}$$

in accordance with equations (1.3) and (1.6) above and further allow $\Delta t_p^+$, $\Delta t_p^-$, $\Delta t_m^+$ and $\Delta t_m^-$ be chosen to be of the form $$\Delta t_p^+=(n_{\Delta p}^+)(\Delta t_{res}) \quad (1.16)$$

$$\Delta t_p^-=(n_{\Delta p}^-)(\Delta t_{res}) \quad (1.17)$$

$$\Delta t_m^+=(n_{\Delta m}^+)(\Delta t_{res}) \quad (1.18)$$

and $$\Delta t_m^-=(n_{\Delta m}^+)(\Delta t_{res}) \quad (1.19)$$

and further limit $\Delta T_p$ and $\Delta T_m$ to the forms:

$$\Delta T_p=m_{\Delta p}\Delta T_{res} \quad (1.20)$$

and $$\Delta T_m=m_{\Delta m}\Delta T_{res} \quad (1.21)$$

With these limitations Equation (1.11) describing the window $PCE_H(t_{ce}, T_{ce})$ becomes:

$$PCE_H(n_{ce},m_{ce})=\{E_H(n,m)|(n_{ce}-n_{\Delta p}^-)\leq n<(n_{ce}+n_{\Delta p}^+), 0\leq m<(m_{ce}+m_{\Delta p})\} \quad (1.22)$$

And the same event in the cooling mode, $PCE_C(t_{ce}, T_{ce})$ by $$PCE_C(n_{ce},m_{ce})=\{E_C(n,m)|(n_{ce}-n_{\Delta p}^-)\leq n<(n_{ce}+n_{\Delta p}^+), 0<m\leq(m_{ce}+m_{\Delta p})\} \quad (1.23)$$

In completely analogous form, a MINUS comfort event, $MCE_H(t_{ce}, T_{ce})$ in the heating mode becomes $$MCE_H(n_{ce},m_{ce})=\{E_H(n,m)|(n_{ce}-n_{\Delta m}^-)\leq n<(n_{ce}+n_{\Delta m}^+), (m_{ce}-m_{\Delta m})\leq m<(M-1)\} \quad (1.24)$$

and the same event in the cooling mode, $MCE_C(t_{ce}, T_{ce})$ can be expressed as $$MCE_C(n_{ce},m_{ce})=\{E_C(n,m)|(n_{ce}-n_{\Delta m}^-)\leq n<(n_{ce}+n_{\Delta m}^+), (m_{ce}-m_{\Delta m})<m\leq(M-1)\} \quad (1.25)$$

These quantized forms are useful in the actual construction and management of maps.

At this point, it is instructive to provide an example of how the system processes an occupant's user comfort feedback data to modify the comfort map. For this example, assume that the single comfort map shown initialized in FIG. 10 is employed continuously, loaded into the system from a profile, for several consecutive episodes. At the end of each episode, it is loaded back into the profile with the data learned from the episode's comfort events, ready for use the next time an episode access the profile to retrieve the comfort map for the next episode. For this example, assume a system of the form of FIG. 4 or FIG. 5 is capable of regulating the temperature in the conditioned space by executing a temperature trajectory at the TEB sequence temperature. For an occupant in a conditioned space, the TEB sequence temperature shown in FIG. 10 might be completely acceptable when asleep, but experienced as too cold when the occupant awakes at 6:00 AM (06h00). To express this, the occupant issues a PLUS comfort event at 06h00 (presses a PLUS pushbutton in one embodiment). To facilitate visualization, the system accesses operational comfort event window parameters for a PLUS button press event window to be:

$$\begin{bmatrix} \Delta t_p^- \\ \Delta t_p^+ \\ \Delta T_p \end{bmatrix} = \begin{bmatrix} 0 \text{ minutes} \\ 60 \text{ minutes} \\ 5° \text{ C.} \end{bmatrix} \quad (1.26)$$

Which, with the example value $\Delta t_{res}$=10 minutes, and $\Delta T_{res}$=0.5° C. gives the equivalent discrete values:

$$\begin{bmatrix} n_{\Delta p}^- \\ n_{\Delta p}^+ \\ m_{\Delta p} \end{bmatrix} = \begin{bmatrix} 0 \\ 6 \\ 10 \end{bmatrix} \quad (1.27)$$

Figure 13:
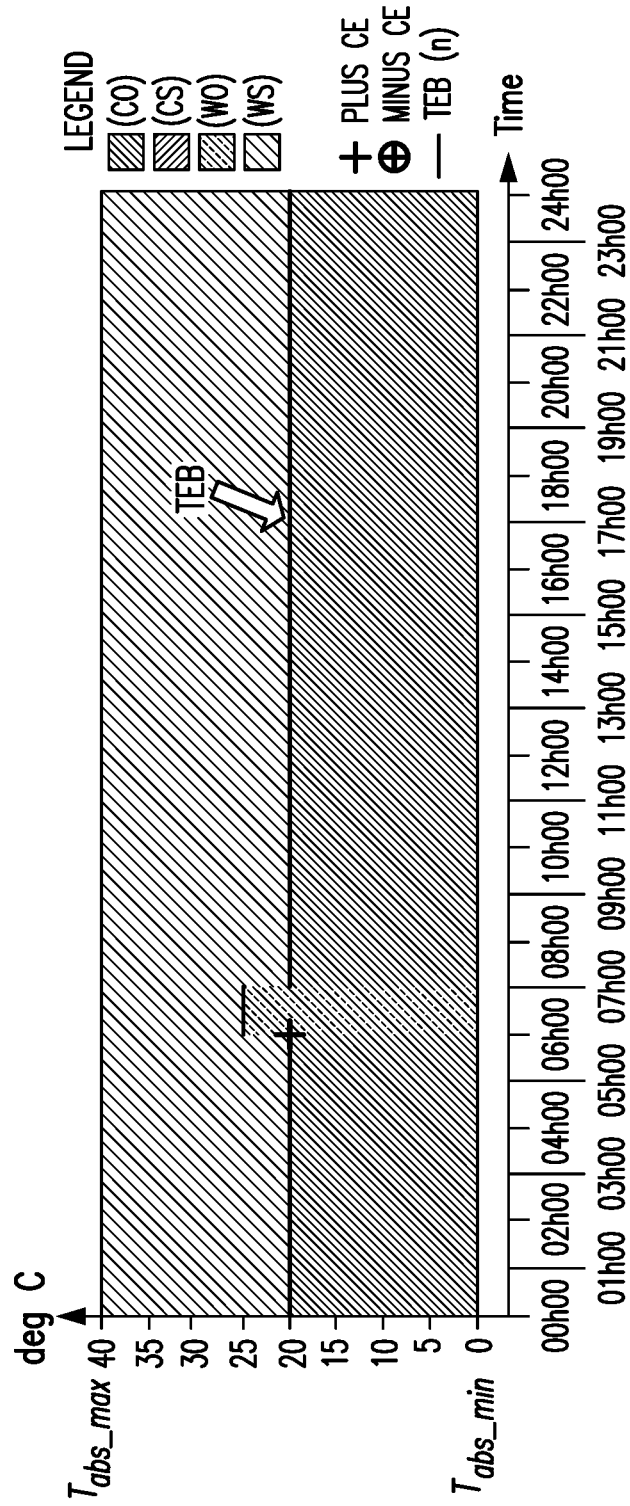
FIG. 13 is a chart (time versus temperature) showing a comfort map after a "PLUS" comfort event, according to some embodiments.

Applying these parameters to the comfort map of FIG. 10 results in the comfort map of FIG. 13.

From the updated comfort map, the system will derive a new execution temperature trajectory, regulating the temperature at the new TEB sequence values:

1. The temperature setpoint immediately increases to 25 C.° at the time $PCE_H$ (06h00, 20° C.) is issued. This has the effect of making the occupant more comfortable quickly, a reward that will reinforce the behavior in the future of pressing the PLUS button when too cool.
2. The temperature setpoint remains at 25 C.° for 60 minutes (defined by the PLUS comfort event window parameter $\Delta t_p^+$=60 minutes).
3. Following the end of $PCE_H$(06h00, 20° C.), which occurs at 07h00, the comfort map TEB reverts back to regulating temperature at 20 C.°.

Figure 14:
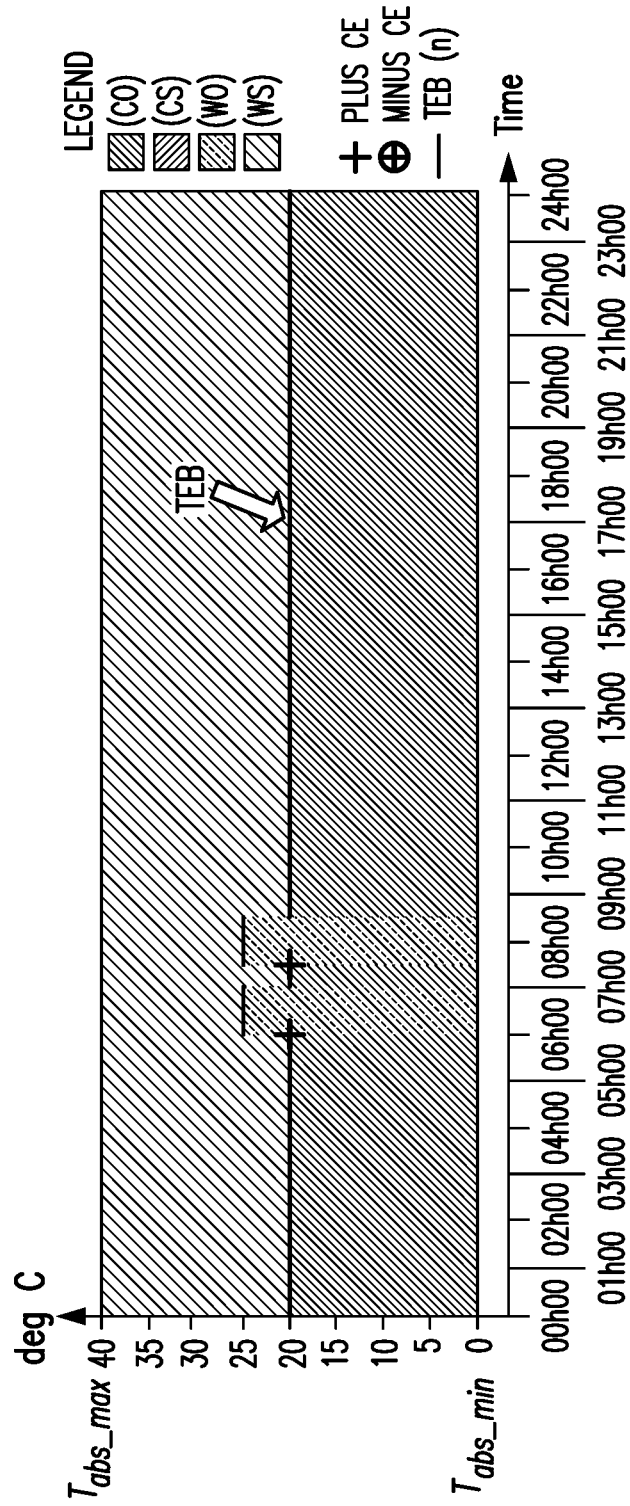
FIG. 14 is a chart (time versus temperature) showing an evolving comfort map, according to some embodiments.

Suppose that it takes 30 minutes for the occupant to realize that the temperature has returned to 20 C.°, and that at 07h30, this temperature is still considered too cold to be comfortable. Because the response of the comfort control system to the first PLUS comfort event was to heat the space, improving comfort, the occupant's discomfort will be highly likely to trigger another PLUS comfort event, $PCE_H$ (07h30, 20° C.). The resulting comfort map updated with this additional comfort event data is shown in FIG. 14.

If the comfort control system again attempts to regulate at the TEB sequence values, the system will once more begin applying heat to the space and will attempt to regulate at 25 C.° for another 60 minutes as dictated by the PLUS comfort event window parameter $\Delta t_p^+$=60 minutes. Following this time (at 08h30), the ideal comfort control system again regulates the temperature at 20 C.° as determined from the TEB sequence of the comfort map, continuing until the end of the episode unless interrupted by another comfort event. Suppose that the occupant has left the conditioned space to go to work at, say 08h00, returns at 2:30 PM (14h30), and chooses to exercise, preferring a cooler temperature during that period. To do this, rather than setting a new temperature set-point by setting an actual temperature value (as would be done in a conventional single set-point thermostat), the occupant simply generates a MINUS comfort event, $MCE_H$ (14h30, 20° C.). Let the MINUS button press event window parameters of:

$$\begin{bmatrix} \Delta t_{ce}^- \\ \Delta t_{ce}^+ \\ \Delta T_{ce}^+ \end{bmatrix} = \begin{bmatrix} 0 \text{ minutes} \\ 60 \text{ minutes} \\ 5° \text{ C.} \end{bmatrix} \quad (1.28)$$

Which, in quantized form, are $$\begin{bmatrix} n_{\Delta ce}^- \\ n_{\Delta ce}^+ \\ m_{\Delta ce} \end{bmatrix} = \begin{bmatrix} 0 \\ 6 \\ 10 \end{bmatrix} \quad (1.29)$$

Figure 15:
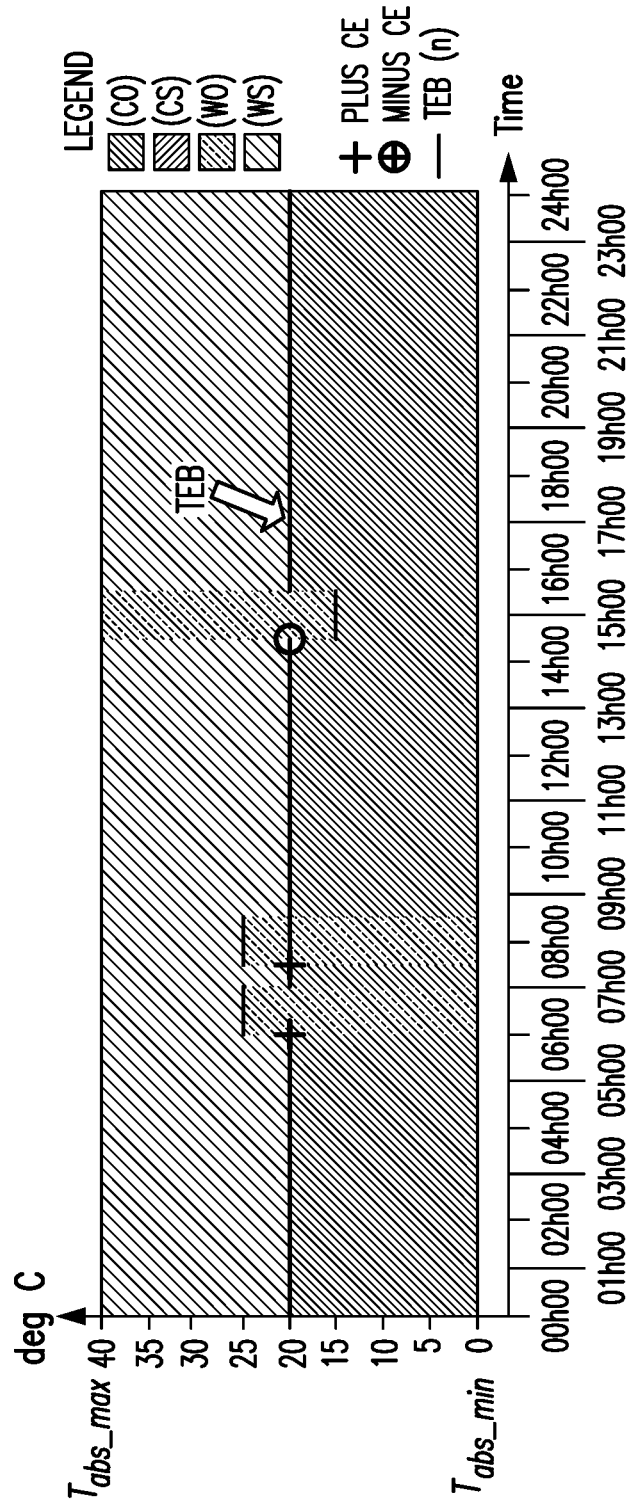
FIG. 15 is a chart (time versus temperature) showing a further evolving comfort map, according to some embodiments.

With these parameters, the system would modify the comfort map by forcing the window defined by equation (1.13) to the set {W} and in some implementations to a subset {WO} as well, with the updated comfort map shown in FIG. 15. ample, assume Finally, to complete the discussion, suppose that the exercise session only lasts 30 minutes, and that the occupant wishes to shower following the session, which ends at 15h00. The occupant would like it to be warmer at that time, issuing another PLUS comfort event $PCE_H$ (15h00, 15° C.). With the PLUS comfort event window parameters of Equation (1.26) above, the resulting comfort map is shown in FIG. 16.

Figure 16:
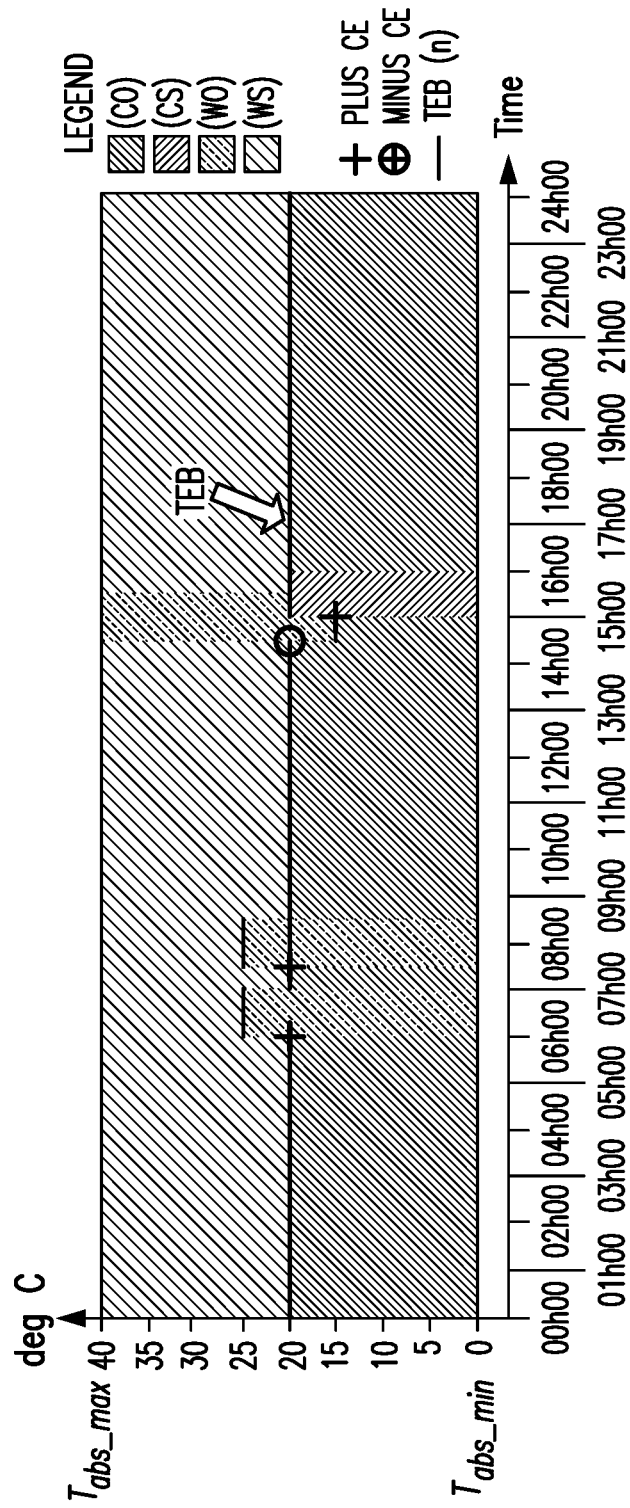
FIG. 16 is a chart (time versus temperature) showing a further evolving comfort map, according to some embodiments.

Clearly, the comfort map of FIG. 16 contains more information regarding the comfort requirements of the occupant than that of FIG. 10 at the beginning of the episode. If it is assumed that this episode is "typical" of the episode sequence to be modeled by the comfort map, storing the updated comfort map back into the appropriate profile for use in the next episode and using the TEB of the updated comfort map of FIG. 16 to start the next episode is likely to evoke less interaction with the occupant than that of FIG. 10. The system has "learned" at least some of the comfort requirements of the occupant by virtue of the interaction with the user, receiving and processing direct user comfort characteristic feedback. This learning is maintained by storing the comfort map at the end of the episode into the appropriate profile in the profile library and should be able to make a more intelligent estimate of them in future episodes. The comfort map of FIG. 16 represents an approximation of the true occupant desires for comfort. The window parameters approximate what the occupant may have meant when a comfort event was issued. In a practical application, the thermal characteristics of the conditioned space and the heating or cooling system may be such that it is unlikely that the actual temperatures match the TEB sequence in time.

Management of Comfort Events at the Episode Time Boundaries of the Comfort Map—There are situations where occupants will initiate comfort events near the boundaries of the comfort map. Two such conditions are considered:

Case 1—The condition in which an occupant initiates a comfort event within $\Delta t_x^+$ of the end of the present episode, where x may be "p" or "m" dependent upon the type of event.

Case 2—The condition in which an occupant initiates a comfort event within $\Delta t_x^+$ of the beginning of an episode, where x may be "p" or "m" dependent upon the type of event. Management of these two conditions is described in the sections that follow.

Figure 17:
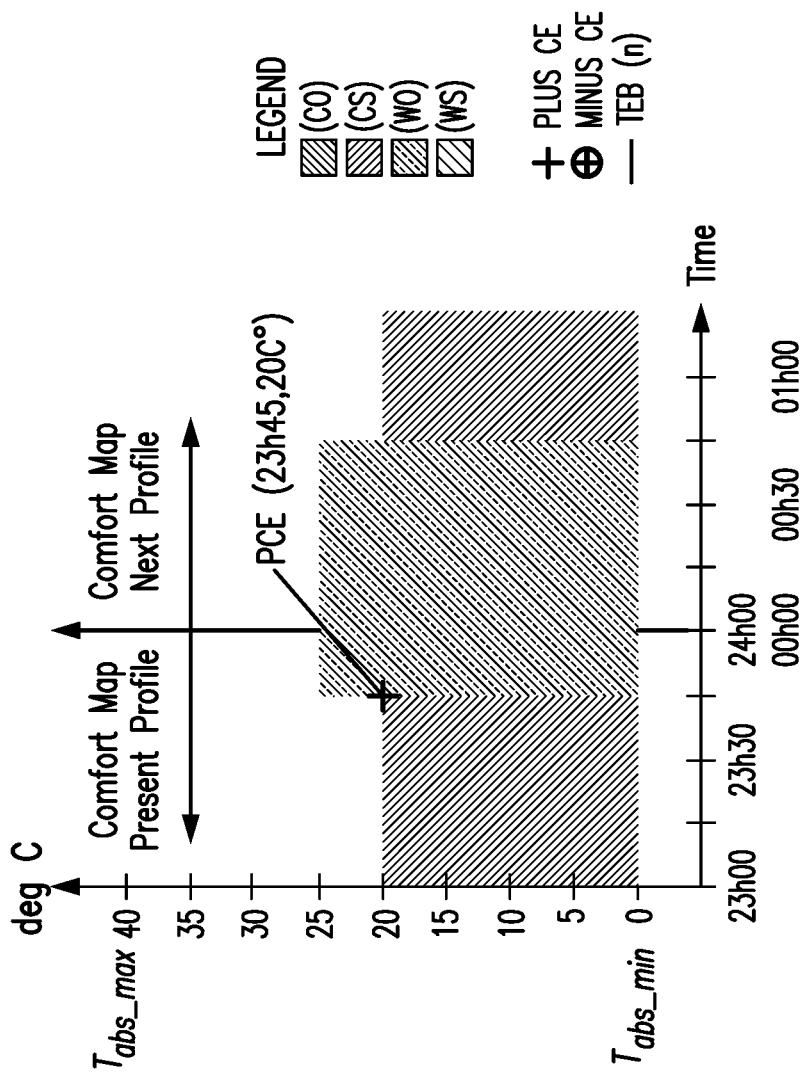
FIG. 17 is a chart (time versus temperature) showing an extension of a comfort event window into a comfort map of a subsequent episode, according to some embodiments.

Case 1—Comfort Event near End of Episode—When a comfort event is initiated within $\Delta t_x^+$ of the end of an episode, the comfort event "window" that would normally fall beyond the end of the present episode must "spill over" to the comfort map from the profile intended to follow the present episode's profile. For instance, if a comfort event occurs on a Monday near the end of the episode, the comfort map intended for Tuesday should be modified to reflect the comfort event. Accordingly, it is possible to have the "spill over" lead into updating the currently active comfort map, if the system identifies that the same profile and comfort map is to be used in consecutive episodes. FIG. 17 shows an exemplary effect of a PLUS comfort event, occurring at (23h45, 20° C.) of an episode, and the extension of a comfort event window into the comfort map of the next episode of the following profile ($\Delta t_p^-$, $\Delta t_p^+$, $\Delta T_p$)=(0 min, 60 min, 5° C.). The result would be similar if a MINUS comfort event were initiated.

Figure 18:
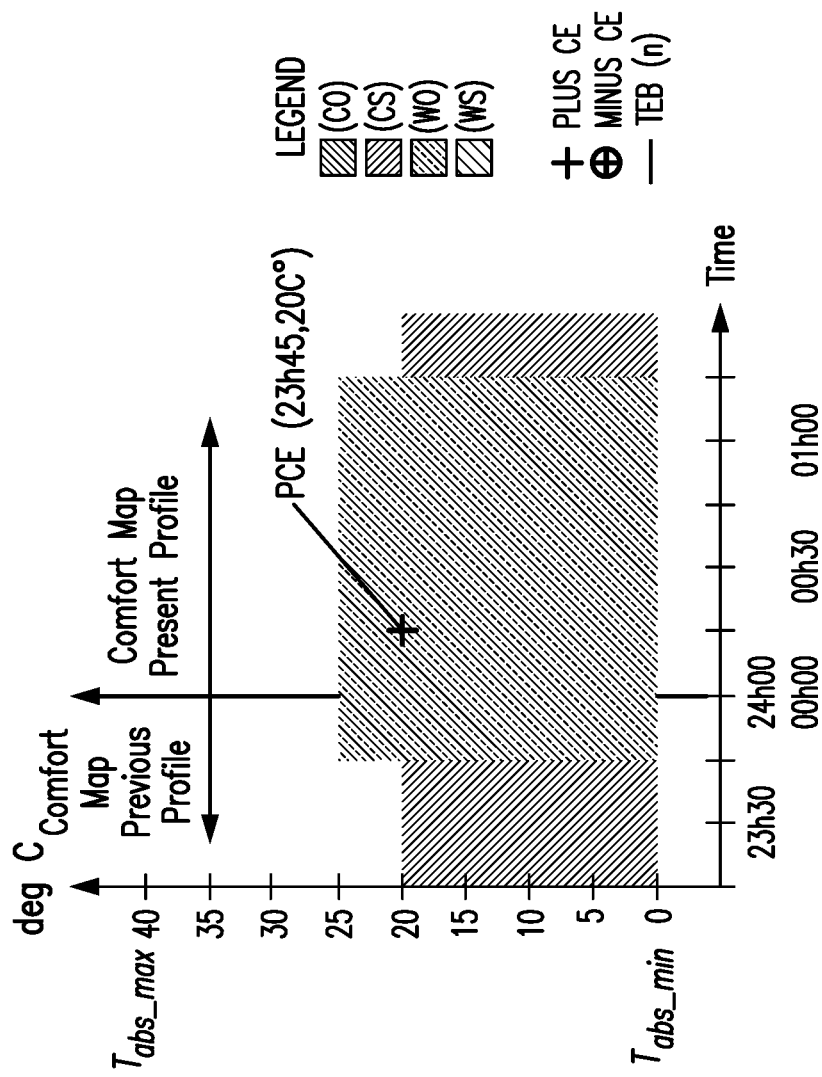
FIG. 18 is a chart (time versus temperature) showing an extension of a comfort event window into a comfort map of a preceding episode, according to some embodiments.

Case 2—Comfort Event at Beginning of Episode—A second scenario in which a comfort event can influence the comfort map of a just-completed episode may occur if the parameter $\Delta t_x^+$ is non-zero. In this case, the comfort event window extends backward into the comfort map from the previous episode. As such, it is possible to have the "spill over" lead into updating the currently active comfort map, if the system identifies that the same profile and comfort map is to be used in consecutive episodes. FIG. 18 shows how the comfort event window is distributed between the comfort map of the present episode and that of the previous episode. In this case, a PLUS comfort event at (00h15, 20° C.) is initiated by an occupant with the following comfort event window parameters:

$$\begin{bmatrix} \Delta t_p^- \\ \Delta t_p^+ \\ \Delta T_p \end{bmatrix} = \begin{bmatrix} 30 \text{ minutes} \\ 60 \text{ minutes} \\ 5° \text{ C.} \end{bmatrix} \quad (1.30)$$

As discussed above, embodiments of the disclosure include a control temperature sequence generator, the function of which is to accept the most recent comfort map from a comfort map manager, and from the comfort map, create a sequence of control temperature values (e.g., an execution temperature trajectory shown as "$T_{con}(n)$" in FIG. 5) going forward in time. As discussed above, in some embodiments when HVAC equipment is operating in the heating comfort mode, time-temperature pairs in the comfort map in the set {C} are to be avoided. Similarly, in some embodiments when HVAC equipment is operating in the cooling comfort mode, time-temperature pairs in the comfort map in the set {W} are to be avoided. Thus the comfort map can provide the control temperature sequence generator with a set of admissible control temperature sequences, and by manipulating the comfort map, through processing direct user feedback from comfort event data, the intelligent agent can influence the control temperature sequences (or "execution temperature trajectories") generated.

Any number of methods can be used to create the execution temperature sequence $T_{con}(n)$ (see FIG. 5). In one implementation, the temperatures represented by the thermal equilibrium boundary of the comfort map are used. One theory behind using the thermal equilibrium boundary is that heuristically, when operating in the cooling comfort mode, regulating at warmer temperatures tends to use less energy than regulating at cooler temperatures. The thermal equilibrium boundary represents, on a time quantum by time quantum basis, the warmest temperature consistent with a control temperature sequence residing entirely in the set {C} of the comfort map. Similarly, in the heating comfort mode, the thermal equilibrium boundary represents the coolest temperature consistent with a control sequence residing entirely in the set {W} of the comfort map.

Referring to the comfort map of FIG. 10, the control temperature sequence resulting from using the thermal equilibrium boundary is a temperature sequence in which each temperature is a constant 20° C.

Figure 19A:
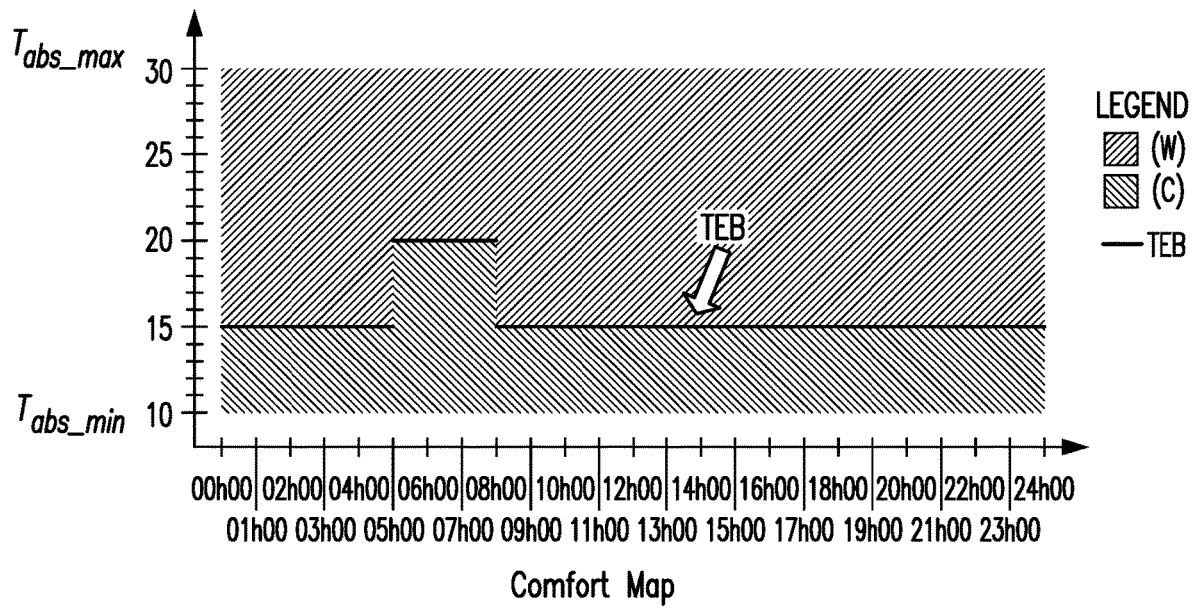
FIG. 19A is a chart (time versus temperature) showing an exemplary comfort map for an episode in which a "PLUS" comfort event has occurred, according to some embodiments.

To further illustrate aspects of the system, FIGS. 19A/19B and 20A/20B describe an additional example that implements a different set of operational comfort window Temperature/Time constraints. It is to be understood that the operational parameters can be customized and/or updated based on a variety of implementional/operational characteristics. For example, it is possible to have coarse, medium, or granular operational defaults for there variables that are established during device commissioning and may be updated anytime thereafter by the system. For example:

Coarse: Temp 2 C.°, (3.6 F.°) coarse time constraints may be implemented as t− 60 minutes to t+ 240 minutes window.

Medium: Temp 1 C.°, (1.8 F.°) med time constraints may be implemented as t− 30 minutes to t+ 120 minutes window.

Granular: Temp 0.5 C.°, (0.9 F.°) coarse time constraints may be implemented as t− 0 minutes to t+ 60 minutes window.

It is to be understood other ranges are possible, as well as various combinations of the ranges discussed herein.

To understand how the system of FIG. 5 can interactively learn/develop a comfort map representative of subjective occupant comfort, consider a case where profile library manager 526 supports a single profile, used daily. In such an embodiment, there is only one comfort map defined. Assume that the initial comfort map presented to the intelligent agent 530 at the beginning of the first episode CM(0), is similar to that of FIG. 10, but with a thermal equilibrium boundary at a constant 15° C., and that control temperature sequence generator 538 uses the rule that the thermal equilibrium boundary at each time quantum is used as the control temperature sequence $T_{con}(n)$. As described herein, and without occupant feedback via comfort events, the control temperature sequence therefore begins and continues at 15 C.°. This temperature may be acceptable while an occupant is asleep, but perhaps the occupant considers this temperature subjectively cool when he or she wakes up at 06h00. To alleviate discomfort, the occupant presses the "PLUS" push-button of the occupant feedback device 542, thereby initiating a PLUS comfort event at 06h00, at an observed/measured temperature of 15° C. Upon receipt of this comfort event, comfort map manager 534 modifies the comfort map, applying a PLUS comfort event window as shown in FIG. 11 to the comfort map. Assume for visualization purposes that the parametric values are:

$$\Delta T_p = 5 \text{ C.}° \quad (1.31)$$

$$\Delta t_p^+ = 120 \text{ minutes} \quad (1.32)$$

and $$\Delta t_p^- = 60 \text{ minutes} \quad (1.33)$$

Figure 19B:
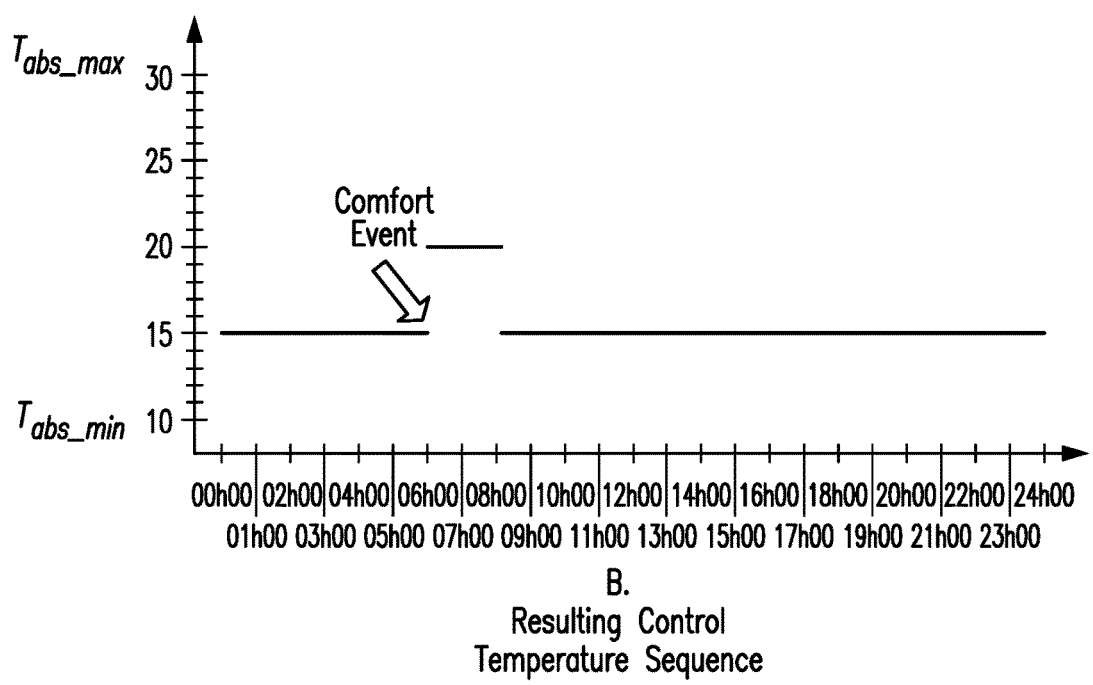
FIG. 19B is a chart (time versus temperature) showing an execution temperature trajectory/sequence corresponding to the comfort map of FIG. 19A, according to some embodiments.
Figure 20B:
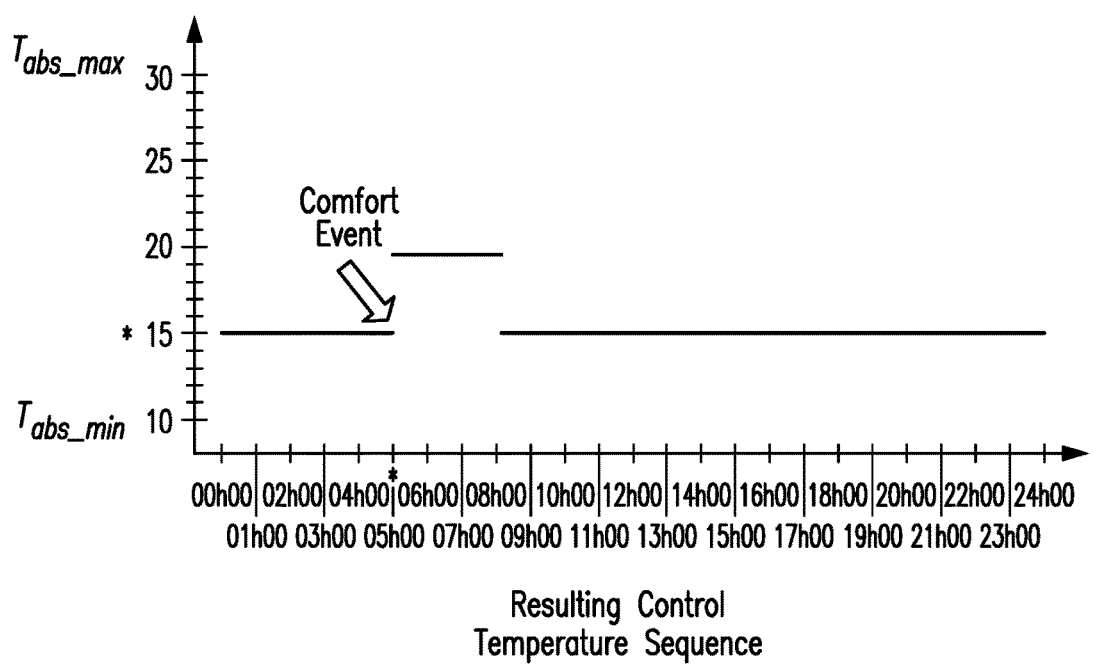
FIG. 20B is a chart (time versus temperature) showing an execution temperature trajectory/sequence corresponding to the comfort map of FIG. 20A, according to some embodiments.

The resulting comfort map is shown in FIG. 19A. When the comfort map of FIG. 19A is provided to control temperature sequence generator 538 at 06h00, a possible resulting new control temperature sequence for the episode is shown in FIG. 19B. Assuming this is the only comfort event for the episode, the control temperature sequence of FIG. 19B represents the actual control temperature sequence for the episode. At the end of the day, the comfort map of FIG. 19A is stored by profile library manager 526. At the beginning of the next day, this same comfort map is presented to comfort map manager 534 by profile library manager 526 as CM(0), repeated as FIG. 20A. Using the strategy for control temperature sequence generation described above, the resulting initial control temperature sequence proposed by the intelligent agent 530 is shown in FIG. 20B. Although the control temperature sequences of FIG. 20B is depicted to "track" or "map" (i.e., coincide with) the TEB, in some embodiments, the control temperature sequence implemented based on a comfort map does not map the TEB, but rather will reside partly or fully within the permissible set corresponding with the mode of operation. In other words, the control temperature sequence may include portions of the TEB of a given episode, or no portions of the TEB.

Interactive Control Temperature Optimization—Accordingly, the system described herein, using profiles, comfort maps, episodes, receiving and processing comfort event data as direct user feedback and ultimately executing a temperature trajectory based on the processed comfort event data/updated comfort maps is a significant improvement and departure from the many drawbacks of programmable schedules:

1. Someone or something must establish the initial schedule for each episodic sequence by way of "programming", which has been shown to be a complicated and distasteful task for the typical consumer.
2. The process of programming begins with the programmer making a guess as to the comfort requirements for the occupants of a space. If the guess does not adequately represent requirements for comfort, the programmed schedules must be modified.
3. A programmed schedule does not readily allow for changing schedules by the occupants. Each time the comfort requirements of the occupants change, the schedule must be re-programmed. This is again a distasteful process for the typical consumer.
4. Schedules must be programmed by specifying temperature values and it is tacitly assumed that the occupants know how to relate temperature to comfort. This promotes a conservative approach to programming, where the occupants may learn to specify temperatures. For instance, in a heating application, the occupants may specify 23° C. as a suggested temperature considered "comfortable" by all, not knowing if 22.5° C. would be considered equally comfortable.
5. While modifying temperatures to improve comfort can be a conditioned response, modifying temperatures to save energy is not, as the reward latency is too high. There is accordingly minimal motivation to modify schedules to save energy and only the most energy conscious consumers will "experiment" with schedules for this purpose.

According to system embodiments described herein, the occupants do not need to program schedules, and instead the system itself takes on the role of developing an optimized user comfort experience and/or experimenting with the objective to save energy. Except for some minor initial commissioning, all interaction by the occupants with the system can be limited to conditioned, categorical (non-numeric) responses to establish comfortable temperatures when the space is actively occupied.

In some embodiments, the learning system makes use of one or more comfort maps, in which each quantum element of the episode space is declared to be in one of two sets, namely "warm" {W} or "cold" {C} as described above. Since it is expected that both the occupants and the system will interact with a comfort map, it is helpful to describe the set {C} as the union of two mutually exclusive sets (i.e., {CO}, comprising those elements of the comfort map declared cool by the occupant and {CS}, comprising those elements of the comfort map declared cool by the system). One set comprising the set {C} is the set of elements that have been declared cold by the occupants via PLUS comfort events. This set will be denoted the set {CO}. The other set comprising the set {C} are those elements declared cold by the system. This set will be denoted the set {CS}. In a completely analogous manner, the set {W} is represented by the union of two mutually exclusive sets, {WO}, which comprises those elements of the comfort map declared warm by the occupants (via MINUS comfort events) and {WS}, comprising those elements of the comfort map declared warm by the system.

Figure 21:
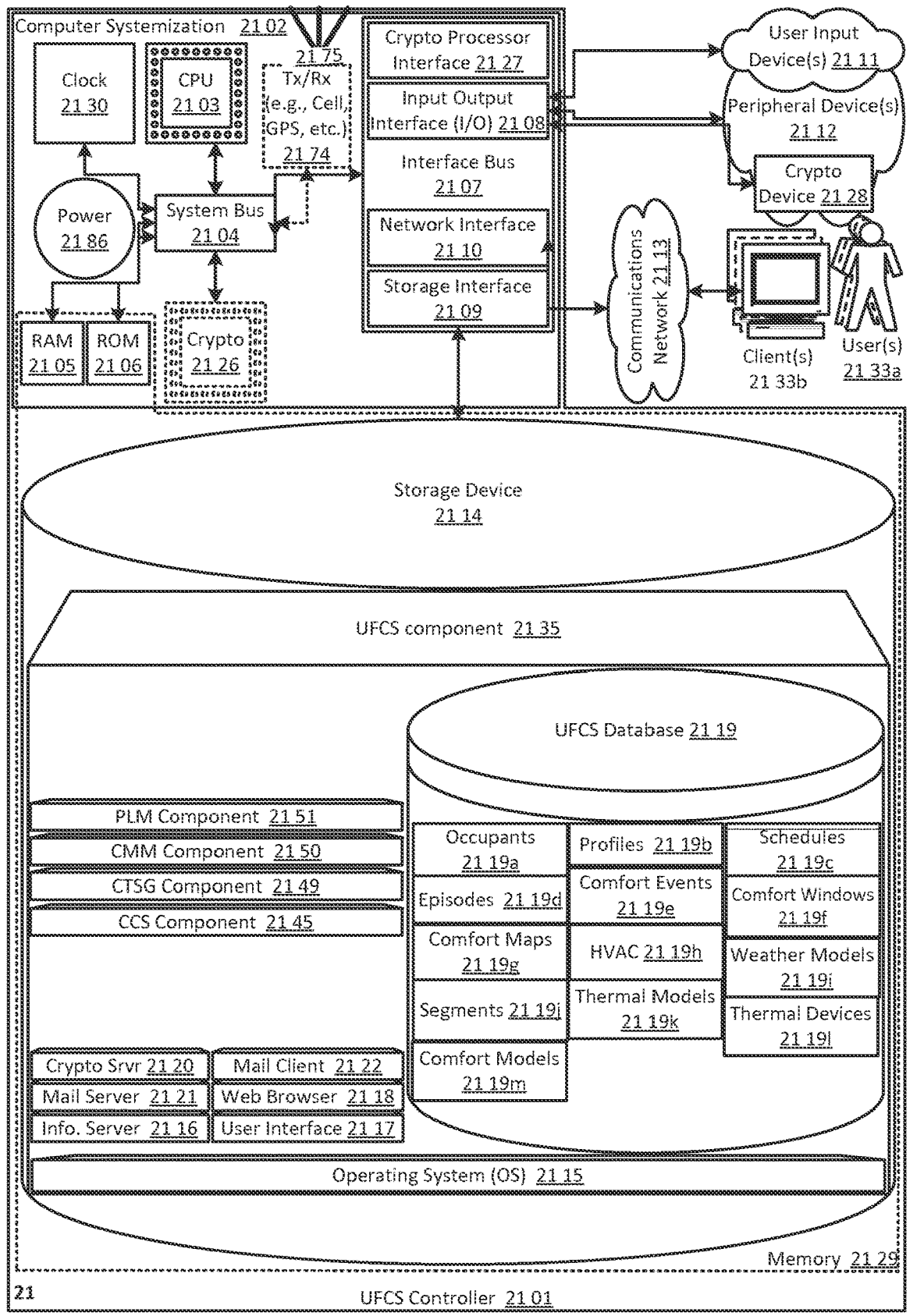
FIG. 21 shows a block diagram illustrating embodiments of a controller, according to some embodiments.

FIG. 21 shows a block diagram illustrating embodiments of a user-feedback comfort system ("UFCS") controller 2101 according to some embodiments. The controller UFCS 2101 may serve to aggregate, process, store, search, serve, identify, instruct, generate, match, and/or facilitate interactions with a computer through various technologies, and/or other related data.

Typically, users, e.g., 2133a, which may be people and/or other systems, may engage information technology systems (e.g., computers) to facilitate information processing. In turn, computers employ processors to process information; such processors 2103 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2129 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the UFCS controller 2101 may be connected to and/or communicate with entities such as, but not limited to: one or more users from user input devices 2111; peripheral devices 2112; an optional cryptographic processor device 2128; and/or a communications network 2113. For example, the controller 2101 may be connected to and/or communicate with users, e.g., 2133a, operating client device(s), e.g., 2133b, including, but not limited to, personal computer(s), server(s) and/or various mobile device(s) including, but not limited to, cellular telephone(s), smartphone(s), smartwatch(es), tablet computer(s), laptop computer(s), notebook(s), netbook(s), console(s), and/or the like.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information in response to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The UFCS controller 2101 may be based on computer systems that may comprise, but are not limited to, components such as: a computer systemization 2102 connected to memory 2129.

A computer systemization 2102 may comprise a clock 2130, central processing unit ("CPU(s)" and/or "processor(s)" (these terms are used interchangeable throughout the disclosure unless noted to the contrary)) 2103, a memory 2129 (e.g., a read only memory (ROM) 2106, a random access memory (RAM) 2105, etc.), and/or an interface bus 2107, and most frequently, although not necessarily, are all interconnected and/or communicating through a system bus 2104 on one or more (mother)board(s) 2102 having conductive and/or otherwise transportive circuit pathways through which instructions (e.g., binary encoded signals) may travel to effectuate communications, operations, storage, etc. The computer systemization may be connected to a power source 2186; e.g., optionally the power source may be internal. Optionally, a cryptographic processor 2126 and/or transceivers (e.g., ICs) 2174 may be connected to the system bus. In another embodiment, the cryptographic processor and/or transceivers may be connected as either internal and/or external peripheral devices 2112 via the interface bus I/O. In turn, the transceivers may be connected to antenna(s) 2175, thereby effectuating wireless transmission and reception of various communication and/or sensor protocols; for example the antenna(s) may connect to: a transceiver and/or receiver chip (e.g., providing 802.11n, Bluetooth 3.0, FM, 2G/3G/4G HSDPA/HSUPA communictions, global positioning system (GPS) (thereby allowing UFCS controller 2101 to determine its location), and/or the like). The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2129 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; ARM's application, embedded and secure processors; IBM and/or Motorola's DragonBall and PowerPC; IBM's and Sony's Cell processor; Intel's Celeron, Core (2) Duo, Itanium, Pentium, Xeon, and/or XScale; and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the controller 2101 and beyond through various interfaces. Should processing requirements dictate a greater amount speed and/or capacity, distributed processors (e.g., Distributed UFCS Platform), mainframe, multi-core, parallel, and/or super-computer architectures may similarly be employed. Alternatively, should deployment requirements dictate greater portability, smart devices or Personal Digital Assistants (PDAs) may be employed.

Depending on the particular implementation, features of the UFCS may be achieved by implementing a microcontroller such as CAST's R8051XC2 microcontroller; Intel's MCS 51 (i.e., 8051 microcontroller); and/or the like. Also, to implement certain features of the UFCS, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the UFCS component collection (distributed or otherwise) and/or features may be implemented via the microprocessor and/or via embedded components; e.g., via ASIC, coprocessor, DSP, FPGA, and/or the like. Alternately, some implementations of the present disclosure may be implemented with embedded components that are configured and used to achieve a variety of features or signal processing.

Depending on the particular implementation, the embedded components may include software solutions, hardware solutions, and/or some combination of both hardware/software solutions. For example, features of the disclosure discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the features described herein. A hierarchy of programmable interconnects allow logic blocks to be interconnected as needed by the system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, embodiments of the disclosure may be developed on regular FPGAs and then migrated into a fixed version that more resembles ASIC implementations. Alternate or coordinating implementations may migrate controller 2101 features to a final ASIC instead of or in addition to FPGAs. Depending on the implementation all of the aforementioned embedded components and microprocessors may be considered the "CPU" and/or "processor" for the UFCS.

The power source 2186 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2186 is connected to at least one of the interconnected subsequent components of the UFCS, thereby providing an electric current to all subsequent components. In one example, the power source 2186 is connected to the system bus component 2104. In an alternative embodiment, an outside power source 2186 is provided through a connection across the I/O 2108 interface. For example, a USB and/or IEEE 1394 connection carries both data and power across the connection and is therefore a suitable source of power.

Interface bus(ses) 2107 may accept, connect, and/or communicate to a number of interface adapters, conventionally although not necessarily in the form of adapter cards, such as but not limited to: input output interfaces (I/O) 2108, storage interfaces 2109, network interfaces 2110, and/or the like. Optionally, cryptographic processor interfaces 2127 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2109 may accept, communicate, and/or connect to a number of storage devices such as, but not limited to: storage devices 2114, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE), fiber channel, Small Computer Systems Interface (SCSI), Universal Serial Bus (USB), and/or the like.

Network interfaces 2110 may accept, communicate, and/or connect to a communications network 2113. Through a communications network 2113, the controller is accessible through remote clients 2133b (e.g., computers with web browsers) by users 2133a. Network interfaces may employ connection protocols such as, but not limited to: direct connect, Ethernet (thick, thin, twisted pair 10/100/1000 Base T, and/or the like), Token Ring, wireless connection such as IEEE 802.11a-x, and/or the like. Should processing requirements dictate a greater amount speed and/or capacity, distributed network controllers (e.g., Distributed UFCS Platform), architectures may similarly be employed to pool, load balance, and/or otherwise increase the communicative bandwidth required by the UFCS controller. A communications network may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. A network interface may be regarded as a specialized form of an input output interface. Further, multiple network interfaces 2110 may be used to engage with various communications network types 2113. For example, multiple network interfaces may be employed to allow for the communication over broadcast, multicast, and/or unicast networks.

Input Output interfaces (I/O) 2108 may accept, communicate, and/or connect to user input devices 2111, peripheral devices 2112, cryptographic processor devices 2128, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; video interface: Apple Desktop Connector (ADC), BNC, coaxial, component, composite, digital, Digital Visual Interface (DVI), high-definition multimedia interface (HDMI), RCA, RF antennae, S-Video, VGA, and/or the like; wireless transceivers: 802.11a/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

User input devices 2111 often are a type of peripheral device 2112 (see below) and may include: card readers, dongles, finger print readers, gloves, graphics tablets, joysticks, keyboards, microphones, mouse (mice), remote controls, retina readers, touch screens (e.g., capacitive, resistive, etc.), trackballs, trackpads, sensors (e.g., accelerometers, ambient light, GPS, gyroscopes, proximity, etc.), styluses, and/or the like.

Peripheral devices 2112 may be connected and/or communicate to I/O and/or other facilities of the like such as network interfaces, storage interfaces, directly to the interface bus, system bus, the CPU, and/or the like. Peripheral devices may be external, internal and/or part of the UFCS controller. Peripheral devices may include: antenna, audio devices (e.g., line-in, line-out, microphone input, speakers, etc.), cameras (e.g., still, video, webcam, etc.), dongles (e.g., for copy protection, ensuring secure transactions with a digital signature, and/or the like), external processors (for added capabilities; e.g., crypto devices 2128), force-feedback devices (e.g., vibrating motors), network interfaces, printers, scanners, storage devices, transceivers (e.g., cellular, GPS, etc.), video devices (e.g., goggles, monitors, etc.), video sources, visors, and/or the like. Peripheral devices often include types of input devices (e.g., cameras).

It should be noted that although user input devices and peripheral devices may be employed, the UFCS controller may be embodied as an embedded, dedicated, and/or monitor-less (i.e., headless) device, wherein access would be provided over a network interface connection.

Cryptographic units such as, but not limited to, microcontrollers, processors 2126, interfaces 2127, and/or devices 2128 may be attached, and/or communicate with the UFCS controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: the Broadcom's CryptoNetX and other Security Processors; nCipher's nShield, SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor line, which is capable of performing 500+MB/s of cryptographic instructions; VLSI Technology's 33 MHz 6868; and/or the like.

Generally, any mechanization and/or embodiment allowing a processor to affect the storage and/or retrieval of information is regarded as memory 2129. However, memory is a fungible technology and resource, thus, any number of memory embodiments may be employed in lieu of or in concert with one another. It is to be understood that the UFCS controller and/or a computer systemization may employ various forms of memory 2129. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2129 will include ROM 2106, RAM 2105, and a storage device 2114. A storage device 2114 may be any conventional computer system storage. Storage devices may include a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); an array of devices (e.g., Redundant Array of Independent Disks (RAID)); solid state memory devices (USB memory, solid state drives (SSD), etc.); other processor-readable storage mediums; and/or other devices of the like. Thus, a computer systemization generally requires and makes use of memory.

The memory 2129 may contain a collection of program and/or database components and/or data such as, but not limited to: operating system component(s) 2115 (operating system); information server component(s) 2116 (information server); user interface component(s) 2117 (user interface); Web browser component(s) 2118 (Web browser); UFCS database(s) 2119; mail server component(s) 2121; mail client component(s) 2122; cryptographic server component(s) 2120 (cryptographic server); profile library manager ("PLM") component(s) 2151; comfort map manager ("CMM") component 2150; control temperature sequence generator ("CTSG") component 2149; comfort control system ("CCS") component 2145; IVTMC and/or OCO component(s) (e.g., as detailed in U.S. application Ser. Nos. 14/955,971 and 14/956,019), and/or the like (i.e., collectively a component collection). These components may be stored and accessed from the storage devices and/or from storage devices accessible through an interface bus. Although non-conventional program components such as those in the component collection, typically, are stored in a local storage device 2114, they may also be loaded and/or stored in memory such as: peripheral devices, RAM, remote storage facilities through a communications network, ROM, various forms of memory, and/or the like.

The operating system component 2115 is an executable program component facilitating the operation of the controller 2101. Typically, the operating system facilitates access of I/O, network interfaces, peripheral devices, storage devices, and/or the like. The operating system may be a highly fault tolerant, scalable, and secure system. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the UFCS controller to communicate with other entities through a communications network 2113. Various communication protocols may be used by the UFCS controller 2101 as a subcarrier transport mechanism for interaction, such as, but not limited to: multicast, TCP/IP, UDP, unicast, and/or the like.

An information server component 2116 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the UFCS controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the UFCS database 2119, operating systems, other program components, user interfaces, Web browsers, and/or the like.

Access to the database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the UFCS. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the UFCS as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple Macintosh Operating System's Aqua, IBM's OS/2, Microsoft's Windows 2000/2003/3.1/95/98/CE/Millenium/NT/XPNista/7 (i.e., Aero), Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, etc.) provide a baseline and way of accessing and displaying information graphically to users.

A user interface component 2117 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

A Web browser component 2118 is a stored program component that is executed by a CPU. The Web browser may be a conventional hypertext viewing application such as Microsoft Internet Explorer or Netscape Navigator. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the UFCS enabled nodes. The combined application may be nugatory on systems employing standard Web browsers.

A mail server component 2121 is a stored program component that is executed by a CPU 2103. The mail server may be a conventional Internet mail server such as, but not limited to sendmail, Microsoft Exchange, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the system.

Access to the UFCS mail may be achieved through a number of APIs offered by the individual Web server components and/or the operating system.

Also, a mail server may contain, communicate, generate, obtain, and/or provide program component, system, user, and/or data communications, requests, information, and/or responses.

A mail client component 2122 is a stored program component that is executed by a CPU 2103. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

A cryptographic server component 2120 is a stored program component that is executed by a CPU 2103, cryptographic processor 2126, cryptographic processor interface 2127, cryptographic processor device 2128, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), and/or the like. Employing such encryption security protocols, the UFCS may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to enable the UFCS component to engage in secure transactions if so desired. The cryptographic component facilitates the secure accessing of resources on the system and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The UFCS database component 2119 may be embodied in a database and its stored data. The database is a stored program component, which is executed by the CPU; the stored program component portion configuring the CPU to process the stored data. The database may be a conventional, fault tolerant, relational, scalable, secure database such as Oracle or Sybase. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. More precisely, they uniquely identify rows of a table on the "one" side of a one-to-many relationship.

Alternatively, the UFCS database 2119 may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the UFCS database 2119 is implemented as a data-structure, the use of the UFCS database 2119 may be integrated into another component such as the component 2135. Also, the database may be implemented as a mix of data structures, objects, and relational structures. Databases may be consolidated and/or distributed in countless variations through standard data processing techniques. Portions of databases, e.g., tables, may be exported and/or imported and thus decentralized and/or integrated.

In one embodiment, the UFCS database component 2119 includes several tables 2119*a*-*m*. An Occupants table 2119*a* may include fields such as, but not limited to: user_id, ssn, dob, first_name, last_name, age, state, address firstline, address secondline, zipcode, device_id, contact_info, contact_type, alt_contact_info, alt_contact_type, user_equipment, user_plane, user_profile, user_preferences, and/or the like. A Profiles table 2219*b* may include fields such as, but not limited to: profile_weekday, profile_weekend, profile_user, profile_holiday, temperature, time_of_day, day_of_week, and/or the like. A Schedules table 2119*c* may include fields such as, but not limited to: schedule_id, temp_1_value, temp_1_duration, and/or the like. An Episodes table 2119*d* may include fields such as, but not limited to: start_time, end_time, start_temp, end_temp, num_segments, map_id, user_id, last_update, and/or the like. A Comfort Events table 2119*e* may include fields such as, but not limited to: event_type, event_time, temp_observed, and/or the like. A Comfort Event Windows table 2119*f* may include fields such as, but not limited to: temp_min, temp_max, time_min, time_max, radius, set_membership, map_id, and/or the like. A Comfort Maps table 2119*g* may include fields such as, but not limited to: map_id, last_edited, user_id, episode_ref, num_segments, optimiz_type, and/or the like. An HVAC table 2119*h* may include fields such as, but not limited to: serial_num, model, password, connection_type, thermostat, ctrl_voltage, max_current, max_surge_current, ctrl_accuracy, temp_ctrl_range, max_temp, min_temp, oper_range, humid_ctrl, and/or the like. A Weather Models table 2119*i* may include fields such as, but not limited to: rate_filter, cloud_cover, humidity_date_time, irradiance_date_time, temp_date_time, update_event, weather_model, weather_source, event_type, compensation_value, time_resolution, update_duration, update_period, update_time, and/or the like. A Segments table 2119*j* may include fields such as, but not limited to: seg_id, seg_length, episode_id, map_id, and/or the like. A Thermal Models table 2119*k* may include fields such as, but not limited to: coefficients, device_temp, update_event, hold_param, memory_duration, population_density, power_set, temp_rate, update_period, and/or the like. A Thermal Devices table 2119*l* may include fields such as, but not limited to: device_factory_data, cool_comfort_temp, cool_limit_temp, device_temp, hold_param, power_set, temp_rate, update_period, and/or the like. A Comfort Models table 2119*k* may include fields such as, but not limited to: factory_comfort_model, eval_date_time, minus_event, plus_event, profile_date_time, update_event, comfort_duration, cool_comfort_temp, cool_limit_temp, device_temp, hold_param, humidity, update_period, and/or the like.

In one embodiment, the UFCS database 2119 may interact with other database systems. For example, employing a distributed database system, queries and data access by a search UFCS component may treat the combination of the database, an integrated data security layer database as a single database entity.

In one embodiment, user programs may contain various user interface primitives, which may serve to update the UFCS. Also, various accounts may require custom database tables depending upon the environments and the types of clients the UFCS may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2119*a*-*m*. The UFCS may be configured to keep track of various settings, inputs, and parameters via database controllers.

The UFCS database 2119 may communicate to and/or with other components in a component collection, including itself, and/or facilities of the like. Most frequently, the UFCS database 2119 communicates with the UFCS component, other program components, and/or the like. The database may contain, retain, and provide information regarding other nodes and data.

The UFCS component 2135 is a stored program component that is executed by a CPU. In one embodiment, the UFCS component 2135 incorporates any and/or all combinations of the aspects of the UFCS system discussed in the previous figures. As such, the UFCS system affects accessing, obtaining and the provision of information, services, transactions, and/or the like across various communications networks.

The UFCS component 2135 transforms occupant comfort input via UFCS components into comfort event windows, comfort maps, effective temperature trajectories, and/or the like. In one embodiment, the component 2135 takes inputs (e.g., button presses, "PLUS" or "MINUS" indications, and/or the like) etc., and transforms the inputs via various components (e.g., PLM component 2151; CMM component 2150, CTSG component 2149, and/or the like), into outputs (e.g., comfort event windows, comfort maps, effective temperature trajectories and/or the like).

The UFCS component 2135 enabling access of information between nodes may be developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo! User Interface; and/or the like), WebObjects, and/or the like. In one embodiment, the UFCS server employs a cryptographic server to encrypt and decrypt communications. The UFCS component may communicate to and/or with other components in a component collection, including itself, and/or facilities of the like. Most frequently, the UFCS component 2135 communicates with the UFCS database 2119, operating systems, other program components, and/or the like. The UFCS may contain, communicate, generate, obtain, and/or provide program component, system, user, and/or data communications, requests, and/or responses.

The structure and/or operation of any of the UFCS node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion.

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the UFCS controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like.

If component collection components are discrete, separate, and/or external to one another, then communicating, obtaining, and/or providing data with and/or to other components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the UFCS controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header ('Content-Type: text/plain');
// set ip address and port to listen to for incoming data
$address = '192.168.0.100';
$port = 255;
// create a server-side SSL socket, listen for/accept incoming
communication
$sock = socket_create(AF_INET, SOCK_STREAM, 0);
socket_bind($sock, $address, $port) or die('Could not bind to address');
socket_listen($sock);
$client = socket_accept($sock);
// read input data from client device in 1024 byte blocks until end of
message
do {
    $input = "";
    $input = socket_read($client, 1024);
    $data .= $input;
} while($input != "");
// parse data to extract variables
$obj = json_decode($data, true);
// store input data in a database
mysql_connect("201.408.185.132",$DBserver,$password); // access
database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/
index.jsp?topic=/com.ibm.IBMDI.doc/referenceguide295.htm and other parser implementations:

http://publib.boulder.ibm.com/infocenter/tivihelp/v2r1/index.jsp?topic=/
com.ibm.IBMDI.doc/referenceguide259.htm all of which are hereby expressly incorporated by reference herein.

In order to address various issues and advance the art, the entirety of this application for INTERIOR COMFORT HVAC USER-FEEDBACK CONTROL SYSTEM AND APPARATUS (including the Cover Page, Title, Headings, Field, Background, Summary, Brief Description of the Drawings, Detailed Description, Claims, Abstract, Figures, Appendices and/or otherwise) shows by way of illustration various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations, including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a UFCS individual and/or enterprise user, database configuration and/or relational model, data type, data transmission and/or network framework, syntax structure, and/or the like, various embodiments of the UFCS may be implemented that enable a great deal of flexibility and customization. For example, aspects of the UFCS may be adapted for integration with flight planning and route optimization. While various embodiments and discussions of the UFCS have been directed to predictive turbulence, however, it is to be understood that the embodiments described herein may be readily configured and/or customized for a wide variety of other applications and/or implementations.

What is claimed is:

1. A method for controlling an HVAC system at a thermostat, the method comprising:
   receiving comfort event data;
   accessing a first comfort map that includes time, temperature and comfort characteristic data;
   updating the first comfort map based on the comfort event data indicating a temperature increase or decrease and a comfort map reference data including a time/temperature pair and an associated comfort characteristic;
   deriving a temperature trajectory from the updated comfort map; and
   executing the temperature trajectory comprising avoiding one of a cool set and a warm set of the updated first comfort map, based on an operational mode of the HVAC system.

2. The method of claim 1, wherein the comfort event data includes comfort characteristic user feedback data.

3. The method of claim 2, wherein the comfort characteristic user feedback data is 'user too warm' current comfort feedback data or 'user too cold' current comfort feedback data.

4. The method of claim 1, wherein the received comfort event data includes non-numeric user comfort feedback data.

5. The method of claim 1, wherein the first comfort map is stored in a comfort map library.

6. The method of claim 1, wherein the first comfort map includes data from at least one profile corresponding to a current time period identified by the system.

7. The method of claim 1, wherein the first comfort map is stored in a profile library that corresponds with a heating HVAC state or a cooling HVAC state.

8. The method of claim 1, wherein the updating the first comfort map comprises: determining whether the comfort event data includes temperature increase request data or temperature decrease request data.

9. The method of claim 1, further comprising determining a comfort event reference point based on the comfort event data.

10. The method of claim 9, wherein an observed current time and an observed current temperature at a time that the comfort event was initiated are used in determining the comfort event reference point.

11. The method of claim 1, wherein updating the first comfort map includes replacing the first comfort map with the updated comfort map.

12. The method of claim 9, wherein the first comfort map is accessed to determine a reference point comfort characteristic on the map corresponding with the comfort event reference point and used to determine how to update the comfort map based on the value of the comfort characteristic.

13. The method of claim 9, further comprising deriving a reference point comfort characteristic from the comfort event data.

14. The method of claim 13, wherein the first comfort map is updated with the reference point comfort characteristic.

15. The method of claim 13, wherein updating the first comfort map comprises defining a comfort map window, and updating a comfort characteristic for points within the comfort map window.

16. The method of claim 1, wherein a membership of points of the comfort map in the cool set or the warm set is based on a corresponding comfort map comfort characteristic.

17. The method of claim 1, wherein the temperature trajectory is a thermal equilibrium boundary ("TEB").

18. The method of claim 17, wherein the TEB is defined as the sequence of temperatures at the bottom of the warm set in heating mode or as the sequence of temperatures at the top of the cool set in cooling mode.

19. An apparatus for HVAC control, comprising:
a processor; and
a memory containing computer program code that, when executed, performs an operation for controlling an HVAC system, comprising:
receive comfort event data;
access a first comfort map that includes time, temperature and comfort characteristic data;
update the first comfort map based on the comfort event data indicating a temperature increase or decrease and a comfort map reference data including a time/temperature pair and an associated comfort characteristic;
derive a temperature trajectory from the updated comfort map; and
execute the temperature trajectory comprising avoid one of a cool set and a warm set of the updated first comfort map, based on an operational mode of the HVAC system.

20. The apparatus of claim 19, wherein the comfort event data includes comfort characteristic user feedback data.

21. The apparatus of claim 20, wherein the comfort characteristic user feedback data is 'user too warm' current comfort feedback data or 'user too cold' current comfort feedback data.

22. The apparatus of claim 19, wherein the received comfort event data includes non-numeric user comfort feedback data.

23. The apparatus of claim 19, wherein the first comfort map is stored in a comfort map library.

24. The apparatus of claim 19, wherein the first comfort map includes data from at least one profile corresponding to a current time period identified by the system.

25. The apparatus of claim 19, wherein the first comfort map is stored in a profile library that corresponds with a heat HVAC state or a cool HVAC state.

26. The apparatus of claim 19, wherein the instructions to update the first comfort map comprises instructions to determine whether the comfort event data includes temperature increase request data or temperature decrease request data.

27. The apparatus of claim 19, further comprising instructions to:
determine a comfort event reference point based on the comfort event data.

28. The apparatus of claim 27, wherein an observed current time and an observed current temperature at a time that the comfort event was initiated are used to determine the comfort event reference point.

29. The apparatus of claim 19, wherein the instructions to update the first comfort map includes instructions to replace the first comfort map with the updated comfort map.

30. The apparatus of claim 27, wherein the first comfort map is accessed to determine a reference point comfort characteristic on the map corresponding with the comfort event reference point and used to determine how to update the comfort map based on the value of the comfort characteristic.

31. The apparatus of claim 27, further comprising instructions to derive a reference point comfort characteristic from the comfort event data.

32. The apparatus of claim 31, wherein the first comfort map is updated with the reference point comfort characteristic.

33. The apparatus of claim 31, wherein instructions to update the first comfort map include instructions to:
define a comfort map window, and update a comfort characteristic for points within the comfort map window.

34. The apparatus of claim 19, wherein a membership of points of the comfort map in the cool set or the warm set is based on a corresponding comfort map comfort characteristic.

35. The apparatus of claim 19, wherein the temperature trajectory is a thermal equilibrium boundary ("TEB").

36. The apparatus of claim 35, wherein the TEB is defined as the sequence of temperatures at the bottom of the warm set in heat mode or as the sequence of temperatures at the top of the cool set in cool mode.

37. A non-transitory computer-readable medium containing computer program code that, when executed by operation of one or more computer processors, performs an operation for controlling an HVAC system at a thermostat, the operation comprising:
receiving comfort event data;
accessing a first comfort map that includes time, temperature and comfort characteristic data;
updating the first comfort map based on the comfort event data indicating a temperature increase or decrease and a comfort map reference data including a time/temperature pair and an associated comfort characteristic;
deriving a temperature trajectory from the updated comfort map; and
executing the temperature trajectory comprising avoiding one of a cool set and a warm set of the updated first comfort map, based on an operational mode of the HVAC system.

* * * * *